(12) United States Patent
Perkins et al.

(10) Patent No.: US 12,222,586 B2
(45) Date of Patent: Feb. 11, 2025

(54) ADJUSTABLE FOCAL LENGTH LENSES AND EYEWEAR INCORPORATING THE SAME

(71) Applicant: ADLENS LTD, Eynsham (GB)

(72) Inventors: Robert Perkins, Eynsham (GB); Alex Edginton, Eynsham (GB); Paul Masser, Eynsham (GB); Andrew Last, Oxford (GB)

(73) Assignee: ADLENS LIMITED, Eynsham (GB)

( * ) Notice: Subject to any disclaimer, the term of this patent is extended or adjusted under 35 U.S.C. 154(b) by 0 days.

(21) Appl. No.: 17/767,518

(22) PCT Filed: Oct. 9, 2020

(86) PCT No.: PCT/GB2020/052533
§ 371 (c)(1),
(2) Date: Apr. 8, 2022

(87) PCT Pub. No.: WO2021/069930
PCT Pub. Date: Apr. 15, 2021

(65) Prior Publication Data
US 2024/0103299 A1    Mar. 28, 2024

(30) Foreign Application Priority Data
Oct. 10, 2019    (GB) ...................................... 1914687

(51) Int. Cl.
*G02C 7/08* (2006.01)
*G02C 1/00* (2006.01)

(52) U.S. Cl.
CPC ............... *G02C 7/081* (2013.01); *G02C 1/10* (2013.01); *G02C 2200/02* (2013.01); *G02C 2200/08* (2013.01); *G02C 2202/08* (2013.01)

(58) Field of Classification Search
None
See application file for complete search history.

(56) References Cited

U.S. PATENT DOCUMENTS 7,393,099 B2 *   7/2008   Koops .................... G02C 7/081
                                                        351/59
7,661,815 B2     2/2010   Lipawsky
                         (Continued)

FOREIGN PATENT DOCUMENTS

CA          2526836 A1    5/2007
CN        102246087 A    11/2011
                         (Continued)

OTHER PUBLICATIONS

Search Report for GB application No. 1914687.7 mailed Feb. 28, 2020, 5 pages.
(Continued)

*Primary Examiner* — Darryl J Collins
(74) *Attorney, Agent, or Firm* — Haynes and Boone, LLP

(57) ABSTRACT

Adjustable focal length eyewear (11) comprising two lenses (21, 22) that are mounted to a frame (14, 15, 16) for supporting the lenses (21, 22) in front of a user's eyes. At least one of the lenses (21, 22) is a variable focal length lens of the kind comprising two superposed lens elements (31, 41) having cooperating optical surfaces that are shaped such that the focal length of the variable focal length lens (21, 22) is variable according to the relative lateral disposition of the lens elements (31, 41). One of the lens elements (31) is fixedly mounted to the frame (14, 15, 16) and the other lens element (41) is movable manually relative to the fixed lens element (31) for varying the focal length of the variable focal length lens (21, 22). Guiding parts (81, 82) are provided on the movable lens element (41) which cooperate with corresponding guiding parts on the fixed lens element (31) or the frame (14, 15, 16) to define and constrain movement of the movable lens element (41) relative to the fixed lens element (31) to a transverse path that extends across the viewing direction. One or more releasable fasteners are provided for releasably fastening the movable lens (Continued)

element (41) to the fixed lens element (31) or frame (14, 15, 16) whilst permitting movement of the movable lens element (41) relative to the fixed lens element (31) along the transverse path.

20 Claims, 22 Drawing Sheets

(56) References Cited

U.S. PATENT DOCUMENTS

| | | | |
|---|---|---|---|
| 9,075,247 | B2 | 7/2015 | Crosby et al. |
| 11,194,174 | B2 | 12/2021 | Stevens et al. |
| 2004/0021823 | A1 | 2/2004 | Wang |
| 2005/0206836 | A1 | 9/2005 | Shapiro |
| 2013/0141692 | A1 | 6/2013 | Crosby et al. |
| 2017/0010481 | A1* | 1/2017 | Ryan .................. G02C 5/14 |
| 2017/0315383 | A1 | 11/2017 | Rattelade |
| 2020/0050022 | A1* | 2/2020 | Spratt .................. G02C 7/081 |

FOREIGN PATENT DOCUMENTS

| | | |
|---|---|---|
| CN | 102782566 A | 11/2012 |
| CN | 108700757 A | 10/2018 |
| CN | 208506397 U | 2/2019 |
| CN | 109407343 A | 3/2019 |
| FR | 2632736 A1 | 12/1989 |
| JP | H02296212 A | 12/1990 |
| JP | 3220618 U | 3/2019 |
| KR | 1020140050846 A | 4/2014 |
| WO | 2006083167 A1 | 8/2006 |
| WO | 2013064679 A2 | 5/2013 |
| WO | 2017144841 A1 | 8/2017 |
| WO | WO 2017/144841 | 8/2017 |

OTHER PUBLICATIONS

International Search Report and Written Opinion for PCT/GB2020/052533 mailed Apr. 1, 2021, 11 pages.
Office Action and Search Report in Chinese Apln. No. 202080083427.6 dated Jul. 19, 2023, 19 pages.
Office Action in Japanese Application No. JP2022-521200 dated Apr. 4, 2022 (w/English Translation).

* cited by examiner

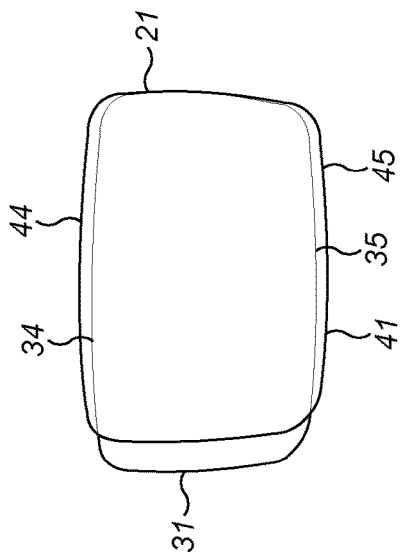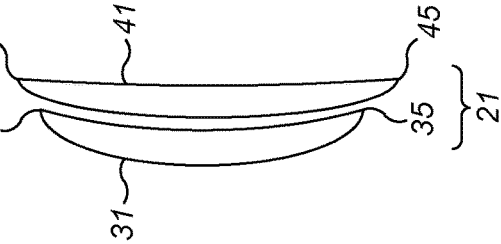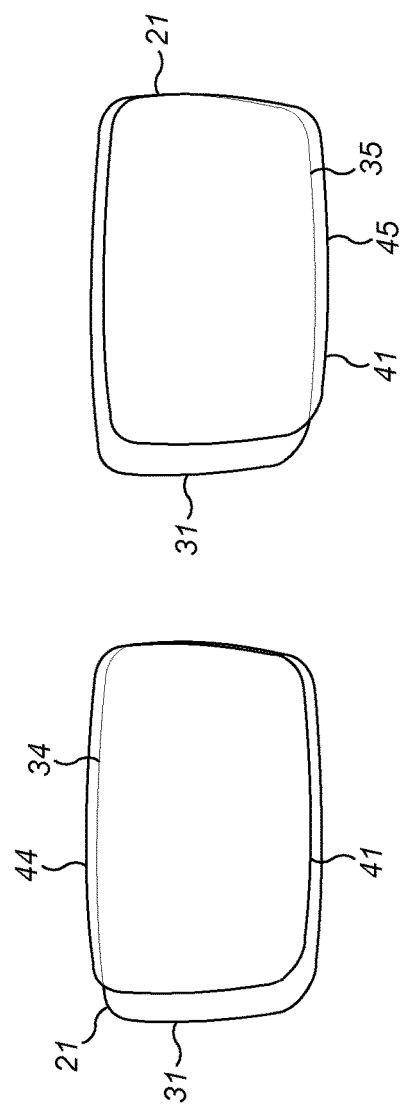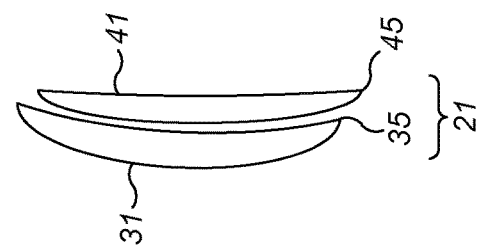

ADJUSTABLE FOCAL LENGTH LENSES AND EYEWEAR INCORPORATING THE SAME

CROSS REFERENCE TO RELATED APPLICATION

This application is a 35 U.S.C. 371 National Phase Entry Application from PCT/GB2020/052533, filed Oct. 9, 2020, which claims priority to United Kingdom Patent Application No. 1914687.7, filed Oct. 10, 2019, the disclosures of which are incorporated herein in their entirety by reference, and priority is claimed to each of the foregoing.

FIELD OF THE INVENTION

The present invention relates to adjustable focal length eyewear comprising two optical lenses of variable focal length of the kind that comprises two lens elements that are positioned one in front of the other relative to the user's eyes, at least one of the lens elements being moveable relative to the other in a transverse direction for adjusting the relative disposition of the lens elements, and the lens elements having mutually cooperating optical surfaces that are shaped such that the focal length of the optical lens is variable according to the relative disposition of the two lens elements. The present invention has particular reference to reading glasses that are suitable for use by persons with presbyopia, but may find broader application within the field of ophthalmic lenses.

BACKGROUND TO THE INVENTION

Optical lenses of the kind described above are well known in the art. An adjustable optical lens of this kind typically has two superposed lens elements with mutually cooperating cubic or higher order surfaces and a relative disposition that can be shifted in a transverse direction relative to an optical axis of the lens for varying the optical power of the lens. Suitably, the transverse direction may extend in a horizontal plane relative to a user in normal use, but in some examples of lenses of this kind, it may extends in a sagittal plane or, at least theoretically, in any other plane with a component that extends orthogonally to the optical axis. An example of this kind of adjustable lens is the Alvarez lens disclosed by U.S. Pat. No. 3,305,294 A, the contents of which are incorporated herein by reference. Other adjustable lenses with cubic and higher order surfaces are disclosed by U.S. Pat. Nos. 3,583,790 A, 7,338,159 B2, 7,717,552 B2, 5,644,374 A and WO 2013/030603 A1, the contents of all of which are also incorporated herein by reference.

Various ways are known in the art for mounting adjustable optical lenses of this kind in a frame for supporting the lenses in front of a user's eyes as a pair of glasses. However, an inherent difficulty with this type of adjustable lens is that except when the lens elements are aligned with one another in a centre position, each of them protrudes beyond the other on opposite sides of the lens, which is aesthetically unattractive, particularly as side edges of the lens elements are visible as lines through the lens. Further, a mechanism for shifting at least one of the lens elements relative to the other must be provided, and the mechanism desirably needs to be concealed within the frame to improve the overall appearance of the glasses.

WO 2006/083167 A1 discloses glasses for everyday use, comprising a frame into which is fitted a lens system for the correction of defective vision, which comprises at least one pair of lenses formed by a first lens and a second lens, which first and second lens, viewed in the path of vision, are disposed one behind the other and are mutually adjustable for realising a desired degree of correction of vision, wherein the first lens is coupled with a first adjusting element and the second lens is coupled with a second adjusting element, and the first and the second adjusting elements in the assembled state form an integral component of an adjusting organ, and are designed for moving one along the other for the purpose of an adjustment of the lenses. The first adjusting element and the second adjusting element may be provided with a first and second thread, respectively. The adjusting organ may comprises a spindle rod, circumferentially provided with a third and a fourth thread designed to engage the first and second thread, respectively, of the first and second adjusting element, respectively. The adjusting organ may be incorporated in the frame, and the spindle rod may have an operating organ that projects at least beyond the outer side of said frame. Whilst the glasses of WO 2006/083167 A1 operate generally satisfactorily, the adjusting organ should desirably be concealed within the frame and the operating organ on the spindle rod protrudes from the frame which is aesthetically unappealing. The focal length of the pair of lenses is continuously adjustable between opposite extremes of movement of the first and second lenses defined by the adjusting organ.

An object of the present invention is to provide a pair of glasses of adjustable focal length which are more aesthetically attractive than similar kinds of glasses known in the art.

Another object of the invention is to provide glasses of adjustable focal length in which the user can selectively adjust the lenses between two or more discrete focal lengths.

Another object of the invention is to provide glasses of adjustable focal length of the kind that comprises two lens elements that are positioned one in front of the other which is easier to clean than similar kinds of glasses known in the art.

SUMMARY OF THE INVENTION

In one aspect of the present invention therefore, there is provided adjustable focal length eyewear comprising two lenses that are mounted to a frame for supporting the lenses in front of a user's eyes and define a viewing direction through each lens. At least one of the lenses is a variable focal length lens of the kind comprising two superposed lens elements having cooperating optical surfaces that are shaped such that the focal length of the variable focal length lens is variable according to the relative lateral disposition of the lens elements. Suitable variable focal length lenses include Alvarez-type lenses of the kind described herein in which the thickness of each lens element between opposite optical surfaces is defined by a cubic function such that in superposition, the two lens elements are equivalent to a spherical lens, the power of which varies according to the relative disposition of the lens elements. In accordance with the invention, one of the lens elements is fixedly mounted to the frame and the other lens element is movable manually relative to the fixed lens element for varying the focal length of the variable focal length lens. Guiding parts are provided on the movable lens element, which cooperate with corresponding guiding parts on the fixed lens element or the frame to define and constrain movement of the movable lens element relative to the fixed lens element to a transverse path that extends across the viewing direction. The guiding parts are configured to permit the movable lens element to be detached from the fixed lens element, at least in one position of the movable lens element. Further, one or more releasable fasteners are provided for releasably fastening the movable lens element to the fixed lens element or frame whilst permitting movement of the movable lens element relative to the fixed lens element along the transverse path. Suitably, the lens includes at least two releasable fasteners that are spaced apart in a direction orthogonal to the direction of viewing.

In some embodiments, the one or more releasable fasteners may include one or more separable mechanical fasteners. Numerous suitable separable mechanical fasteners are available to those skilled in the art including, for example, separable mechanical fasteners of the kind comprising interengaging resilient formations on the fixed and movable lens elements. The resilient formations may define a bump-fit or ball-and-socket joint of the kind in which a ball engages in a slot to permit relative movement of the lens elements along the transverse path. The "ball" may be spherical or non-spherical. For instance, the ball may be longer on one axis than it is on other axes to prevent twisting of the ball in the socket around one or more axes. This may serve to make a neck portion behind the ball stronger. Upon application of progressively increasing separating forces that urge the lens elements apart in the direction of viewing, the interengaging resilient formations on the fixed and movable lens elements initially may resist separation of the lens elements whilst permitting movement of the movable lens element along the transverse path and eventually deform to allow the interengaging resilient formations to disengage from one another, thereby allowing the movable lens element to be detached from the fixed lens element.

In some embodiments, the mechanical fasteners may define one or more discrete detent positions in the transverse path at which the lens elements are held together releasably in the direction of the transverse path, so that additional force is needed to displace the lens elements from the detent position for sliding along the transverse path. For example, where the mechanical fasteners comprise a ball-and-socket joint in which a ball is held releasably in an elongate slot as described above, additional formations, such as bumps or the like, may be provided at one or more discrete locations along the slot, e.g. at one or both ends of the slot, to retain the ball and thus the lens elements in place until additional force is applied.

Alternatively, the one or more releasable fasteners may include one or more magnetic fasteners. Suitably, the one or more magnetic fasteners may comprise mutually cooperating discrete magnetic parts on the movable lens element and the fixed lens element or the frame which define at least two selectable discrete detent positions of the movable lens element relative to the fixed lens element.

The eyewear may comprise a pair of glasses (i.e. spectacles) or goggles. In some embodiments, the eyewear may comprise a headset such, for example, as an augmented or virtual reality head-up display.

The lens elements are configured to provide a different focal length at each discrete position. It will be appreciated by those skilled in the art that in each relative position of the lens elements, the variable focal length lens will define an optical (z) axis, i.e. an axis that is substantially perpendicular to the lens and represents a path of a ray of light through the lens with no net change in direction. Conveniently, the lens elements may be configured and arranged such that as the focal length of the lens is decreased, the optical axis of the lens shifts inwardly, i.e. towards the user's nose and, conversely, when the focal length of the lens is increased, the optical axis of the lens shifts outwardly, i.e. towards the user's temple. This corresponds to how the eyes move to focus from far to near and aims to help improve the user's optical experience from the arrangement of moving lens elements.

The variable focal length lens may be adjustable to alter the optical power of the lens by up to about +7.5 dioptres, which is suitable for the correction of presbyopia in most people. In some embodiments, a narrower range of variation may be provided, e.g. 1, 2, 3, 4, 5 or 6 dioptres, which may allow the manufacture of thinner lenses. In some embodiments, the variable focal length lens may have a base focal length for correction of myopia or hyperopia and/or may be configured to afford a degree of cylinder for the correction of astigmatism. Thus, the variable focal length lens may typically have a base optical power in the range of about −6 to +6 dioptres, although in some cases a stronger prescription may be called for.

The one or more magnetic fasteners are provided for stably holding the lens elements together at two or more selectable discrete positions along the transverse path. Suitably, the strength of the magnetic fasteners is sufficient to hold the lens elements firmly together in use whilst permitting the movable lens element to be moved manually relative to the fixed lens element by a user between the two or more discrete positions, for selecting different focal lengths of the lens and to be removed when desired. Those skilled in the art would have no difficulty in selecting magnetic fasteners of suitable strength to control the retention and sliding friction forces between the lens elements.

The magnetic fasteners may define at least two selectable discrete detent positions of the movable lens element along the transverse path relative to the fixed lens element. In some embodiments, the magnetic fasteners may define three selectable discrete detent positions of the movable lens element along the transverse path relative to the fixed lens element.

Suitably, the lens may comprise two or more magnetic fasteners between the movable lens element and the fixed lens element or frame. The magnet fasteners may be spaced apart for holding the lens elements together in a stable fashion in conjunction with the guiding parts; for example to resist twisting, wobbling or other unwanted movements of the lens elements relative to one another. The two or more magnetic fasteners may be spaced apart in the direction of the transverse path, which will typically extend from one lateral side of the lens to another, relative to a user, or they may be positioned one above another in a top-to-bottom direction relative to the user. In some embodiments it may be possible to use only one magnetic fastener per lens.

The or each magnetic fastener may comprises a group of discrete magnetic parts on one of the movable lens element or the fixed lens element or frame and at least one cooperating magnetic part on the other of the fixed lens element or frame or the movable lens element. The magnetic parts on the movable lens element and the fixed lens element or frame attract one another to attach the movable lens element to the fixed lens element or frame whilst permitting manual movement of the movable lens element relative to the fixed lens element along the transverse path and manual detachment of the movable lens element from the fixed lens element or frame when desired. Suitably, the magnetic parts in the group may be spaced apart along the transverse path.

The magnetic parts within the group and/or the cooperating magnetic part may comprise permanent magnets. In some embodiments, all of the magnetic parts in the group may comprise a permanent magnet, and the cooperating magnetic part may comprise a permanent magnet or a ferromagnetic component. Alternatively, all of the magnetic parts in the group may comprise ferromagnetic components and the cooperating magnetic part may comprise a permanent magnet. Suitably, the magnetic parts are arranged to attract one another for releasably fastening the two lens elements together. Suitably, both the magnetic parts in the group and the cooperating magnetic part are permanent magnets.

The group of magnetic elements serve to define the discrete relative positions of the lens elements along the transverse path, with the lens elements being attached to each other most strongly in each position. Suitably, the magnetic parts are arranged to hold the lens elements together between the discrete positions, but may do so less strongly such that the lens elements "snap" into one of the discrete positions when moved by a user. Since the lens elements are movable relative to one another by hand, the differential retention strength between the discrete positions and other points along the transverse path may provide a degree of haptic feedback to the user when the lens elements are arranged in the discrete positions, thus providing a perceptible detent at each discrete position.

As described below, in some embodiments, the magnetic parts may further be arranged such that the lens elements are retained in one or more of the discrete detent positions more strongly than in others of the discrete detent positions. For example, the lens elements may be held together more strongly in a centre detent position than in end detent positions when the lens elements are disposed at the extremities of their travel along the transverse path. In particular, the transverse path may have two opposite lateral extremities where the lens elements cannot move any further in one direction. Magnetic parts may be positioned on the transverse path at such lateral extremities, such that two discrete outer detent positions coincide with the ends of the transverse path.

In some embodiments the magnetic parts may define only two discrete outer detent positions. However, in some embodiments, a third magnetic part may be positioned to define a centre detent position intermediate the outer detent positions, for example. As mentioned above the magnetic fastener may have a greater retention strength in the centre detent position than in the outer detent positions, so the user is able to feel when the lens elements are arranged in the centre position. This differential retention strength may be provided by arranging the magnetic parts such that the retention strength is greater in the centre position than in the outer positions. For instance, the three magnetic parts may be positioned sufficiently close together that in the centre position, the combined force of the magnetic elements on the cooperating magnetic part is greater than it is in the outer positions. Alternatively, multiple magnets, differently shaped magnets or magnets with different grades, e.g. N52, N48, N35 (where higher numbers indicate a higher pull force for the same size/shape of magnet) may be used. In some embodiments, a similar haptic effect may be achieved by non-magnetic components, such for example as bump fits, leaf springs and the like between the lens elements.

In some embodiments, the optical surfaces of the lens elements may be formed on a base curve in a manner known to those skilled in the art. Thus, instead of being a straight line, the transverse path may in some embodiments be arcuate in a plane defined by the optical axis and a horizontal (x) axis that is perpendicular to the optical (z) axis and extends between temple and nasal sides of the lens, so that movement of the movable lens element along the transverse path substantially follows the base curve. The guiding parts on the movable lens element and the cooperating guiding parts on the fixed lens element or the frame may therefore define a curvilinear transverse path for the movable lens element. However, in some embodiments, the transverse path may be substantially linear.

The guide parts on the fixed and movable lens elements may form at least two linear or curvilinear guides that define that transverse path. Suitably, the guides may be spaced apart from one another in the direction of the transverse path. This may help support the movable lens element from rotating about the optical axis relative to the fixed lens element.

In some embodiments, the guide parts may be formed or attached directly to the lens elements. For instance, in some embodiments, each guide may comprise a dowel mounted on one of the lens elements and a slot formed in the other lens element. The dowel may engages with edges of the other lens element around the slot for constraining relative movement of the two lens elements to the transverse path.

In some embodiments, the dowel may be magnetic and a group of two or more magnetic parts may be attached to the other lens element at two or more discrete locations within the slot to cooperate with the magnetic dowel to fasten the two lens elements together and define the selectable discrete detent positions. Suitably, the slot may be a blind slot having a front or back wall which is formed by a region of the other lens element of reduced thickness adjacent the slot. The magnetic parts of the group may be fitted in recesses formed in the front or back wall. The slot may have two opposite lateral ends. The group of two or more magnetic parts may include two magnetic parts that are fastened to the other lens element, one at each end of the slot.

Suitably, the front or back wall of the other lens element may form an axial bearing surface that engages an end portion of the dowel to stabilise movable lens element relative to the fixed lens element in the viewing direction. The front or back wall of the slot may have a bearing surface within the slot. The bearing surface may be formed from, treated to have or coated to form a low friction surface.

Alternatively, a magnetic part may be fastened to the one lens element adjacent the dowel and a group of two or more magnetic parts may be fastened to the other lens element at two or more discrete locations adjacent the slot to cooperate with the magnetic part on the one lens element to attach the two lens elements together and define the selectable discrete detent positions.

In general, the guiding elements allow the lens elements to be freely separated from one another, particularly in the direction of viewing. However, in some embodiments, the guiding elements may include retention elements arranged to prevent removal of the movable lens element from the fixed lens element except when the movable lens element is positioned in certain positions relative to the fixed lens element; for instance in one or more of the discrete locations. Suitably, the dowel therefore may be configured to engage a cooperating rib on the other lens element that extends in the slot to prevent detachment of the movable lens element, except in at least one position of the movable lens element relative to the fixed lens element. In some embodiments, therefore, the rib may stop short of at least one lateral end of the slot such that the movable lens element can be moved to position with the dowel at that end of the slot where it is disengaged from the rib, allowing the movable lens element to be detached from the fixed lens element.

In other embodiments, the rib may be formed with a notch intermediate the lateral ends of the slot, thereby providing two spaced-apart rib portions. In these embodiments, the rib is configured such that the movable lens element can be moved to a position with the dowel at the notch where it is disengaged from the rib portions. For example, the rib may extend between the lateral ends of the slot and the notch may be formed in the rib substantially midway between the lateral ends of the slot. In this embodiment, the movable lens element can be moved to the position with the dowel midway between the lateral ends of the slot to disengage the dowel from the rib, thereby allowing the movable lens element to be detached and removed from the fixed lens element.

Variable focal length lenses in accordance with the present invention in which the guiding parts and magnetic fasteners are attached directly to the lens elements may be mounted in regular frames, including rimless frames without any requirement to customise the frame.

In accordance with another aspect of the present invention therefore there is provided a variable focal length lens of the kind comprising two lens elements that are mutually superposed in a direction of viewing through the lens and have cooperating optical surfaces that are shaped such that the focal length of the variable focal length lens is variable according to the relative lateral disposition of the lens elements in a direction transverse the direction of viewing. Mutually cooperating guiding parts are provided on the lens elements which define and constrain relative movement of the lens elements to a transverse path that extends in the transverse direction. One or more releasable fasteners are provided for releasably fastening the two lens elements together whilst permitting relative movement of the lens elements along the transverse path.

As described above, the one or more releasable fasteners may include one or more separable mechanical fasteners or one or more magnetic fasteners. Suitably, the one or more magnetic fasteners may comprise mutually cooperating discrete magnetic parts on the lens elements which define at least two selectable discrete detent positions of the lens elements relative to one another. Two or more magnetic fasteners may be provided between the lens elements, which define at least two selectable discrete detent positions of the lens elements relative to one another along the transverse path. In some embodiments, the magnetic fasteners may define three selectable discrete detent positions of the lens elements relative to each other along the transverse path.

The variable focal length lens in accordance with the present invention may be mounted in a suitable frame to form a pair of glasses. The frame may be rimless or may include a rim portion around each lens in addition to the usual temple arms and nose-bridge. In some embodiments, the lens may be mounted to the frame such that both lens elements are movable in the frame. In some embodiments, the two lens elements may be connected for equal and opposite movement along the transverse path. In such case, the position of the optical axis will remain substantially fixed relative to the frame, regardless of the relative disposition of the lens elements.

In some embodiments, the frame may comprise a temple arm that is attached to the fixed lens element over the slot.

Alternatively, each guide may comprise a bearing fastened to or formed integrally with the frame and a mount fastened to the moveable lens element. The bearing may define a slot and the mount may be shaped to engage with the bearing in the slot for constraining relative movement of the two lens elements to the transverse path.

In some embodiments, the frame may comprises an elbow portion that interconnects a temple arm and the fixed lens element. Conveniently, the bearing may be provided on the elbow portion. The mount may be attached to the movable lens element at a corresponding location.

In some embodiments, the frame may comprise a nose-bridge that interconnects the two lenses and has two opposite ends. The bearing may be provided on one end of the nose-bridge. The mount may be attached to the movable lens element at a corresponding location.

Suitably, the frame may include a temple bearing on the elbow portion and a nasal bearing on the end of the nose-bridge. In a complete pair of glasses having two temple arms and a nose-bridge, each temple arm may have an elbow portion including a bearing for engagement with a temple mount formed on a respective one of the lenses, and the nose-bridge may have a nasal bearing formed at each end for engagement with a nasal mount formed on each lens.

A magnetic part may be fixed to the mount and a group of two or more magnetic parts may be fixed to the bearing at two or more discrete locations within the slot to cooperate with the magnetic part on the mount to attach the two lens elements together and define the selectable discrete detent positions. In some embodiments, the group of magnetic parts may include two magnetic parts that are fixed to the bearing, one at each end of the slot. In some embodiments, the group of magnetic parts may further comprise a magnetic part that is fixed to the bearing in a centre detent position intermediate the two ends of the slot.

In accordance with the present invention, therefore, the magnetic fastenings may thus define two or more modes of use of the lens. In a first mode, the lens elements may be configured in a relatively low optical power (long focal length) relative disposition, which may be suitable for distance viewing. In a second mode, the lens elements may be configured in a relatively high optical power (short focal length) disposition, which may be suitable for reading. Where three or more discrete detent positions are defined by the magnetic fastenings, there may be one or more intermediate distance modes suitable for computer use, for example. The intermediate distance modes may be achieved when the lens elements are arranged with a relative disposition between the two extreme positions of the first and second modes.

Suitably, the bearing may include one or more retaining nibs that are configured and positioned to prevent removal of the mount from the bearing except at one or more of the discrete detent positions. For instance, the retaining nibs may be positioned relative to the slot to prevent the mount from being detached from the bearing intermediate two end detent positions of the lens elements where the lens elements are positioned at an end of the transverse path. Alternatively, where one or more intermediate detent positions are provided, the retaining nibs may be positioned to prevent removal of the mount except in one of the intermediate detent positions, e.g. a centre detent position when there are three discrete detent positions.

In some embodiments, the magnetic parts on the bearing and the mount may be oriented in the direction of viewing, i.e. generally parallel to the optical axis of the lens. Alternatively, the magnetic parts on the bearing and the mount may be oriented perpendicularly to the direction of viewing, for instance substantially parallel to a vertical (y) axis that is substantially orthogonal to the optical (z) axis and the horizontal (x) axis as defined above.

Advantageously, the group of magnets in the slot may be mounted within an insert that is fastened to the bearing within the slot. The insert may have a low friction bearing surface that engages the mount.

In another aspect of the present invention, at least part of one of a top or bottom edge of the movable lens element may protrude respectively above or below a corresponding part of a top or bottom edge of the fixed lens element to facilitate manual movement of the movable lens element by a user between the discrete detent positions and/or detaching the movable lens element from the fixed lens element. In some embodiments, at least part of the bottom or top edge of the fixed lens element may protrude beyond at least part of the bottom or top edge of the movable lens element. In this way, the user can easily engage with his or her fingers and thumb one edge of the movable lens element and an opposite edge of the fixed lens element for applying a sliding force to the movable lens element. A similar arrangement may be provided in the variable focal length lenses of the present invention in which both lens elements are movable; at least part of one of the top or bottom edges of one of the lens elements may protrude above or below at least part of the corresponding edge of the other lens element. At least part of the other of the bottom and top edges of the other lens element may protrude below or above at least part of the corresponding edge of the one lens element. Alternatively, at least part of each of the top and bottom edges of the movable lens element may protrude respectively above and below corresponding top and bottom edges of the fixed lens element to facilitate manual movement of the movable lens element by a user between the discrete detent positions or removal of the movable lens element from the fixed lens element for cleaning, repair or the like.

In some embodiments, the frame may include a rim portion that extends at least partially around the variable focal length lens. Each guide may comprise a guide pin that protrudes from the rim portion or from the movable lens element towards the other of the movable lens element or the rim portion, and a slot formed in the movable lens element or in the rim portion, respectively. The guide pin may engage with edges of the movable lens element or rim portion as the case may be around the slot for constraining relative movement of the two lens elements to the transverse path.

A group of two or more magnetic parts may be attached to the rim portion or to the movable lens element at two or more discrete locations and a cooperating magnetic part may be attached to the movable lens element or to the rim portion, respectively, to attach the movable lens element to the frame and to define the selectable discrete detent positions. Suitably, the group of two or more magnetic parts and cooperating magnetic portion may be attached to the rim portion and to the movable lens element proximate a top or bottom edge of the lens. The rim portion may include temple and nasal side portions. Advantageously, the movable lens element may be wider than the fixed lens element in the direction of the transverse path, i.e. in the direction of the x-axis. The temple and nasal side edges of the movable lens element may thus be dimensioned to remain behind the temple and nasal side portions of the rim portion in the direction of viewing regardless of the position of the movable lens element along the transverse path.

An advantage of the present invention is that the lenses can be moulded (e.g. by injection moulding) or cut using standard ophthalmic edging (cutting) equipment and does not require any specialist tools or skills to assemble.

According to a further aspect of the invention, there is provided a method of manufacturing a lens element for use as a lens element in aspects of the invention described above. The method comprises using a rebate which extends partway through the thickness of a lens element as a datum for cutting one or more other features into the lens element. This manufacturing process, whereby a rebate is used as a datum for cutting other features into the lens element, facilitates production of lens elements having different sizes, geometries, and optical powers. For example, by using a rebate of a fixed size and geometry as a datum across a range of lens element sizes, thicknesses and geometries, the process of cutting other features into the lens elements can be standardised and therefore does not need to be substantially changed when switching between different lens element configurations.

The method may comprise the step of forming the rebate in a surface of a lens element. The rebate may be formed in a front or rear surface of the lens element. The rebate may be moulded into the lens element if the lens element is manufactured by a moulding process (e.g. injection moulding). Alternatively, the rebate may be cut into the lens element. The rebate may be shaped to receive a portion of one or more of a frame, or frame member such as a temple arm, or nose bridge. For example, the rebate may be provided on a front surface of the lens element and may be shaped to receive an elbow portion of a temple arm such that the elbow portion sits flush with a front surface of the lens element. The rebate may therefore provide a standardised surface for attachment of part of a frame or frame member which is independent of the lens element size, thicknesses, geometries, and user's prescription. A plurality of rebates may be provided in the lens element. For example, a rebate may be provided on a nasal side of the lens element and a second rebate may be provided on a temple side of the lens element.

The one or more other features may be cut within the rebate. The one or more other features may be configured to accommodate one or more magnetic parts such as, for example, magnetic dowel pins or permanent magnets. The one or more other features may be configured for fastening the lens element to one or more of a frame, temple arm, or nose bridge. The one or more other features may be configured to accommodate guiding parts that define and constrain movement of a movable lens element relative to a fixed lens element. The one or more other features may be, for example, one or more slots, ribs, rib portions, or holes.

Following is a description by way of example only with reference to the accompanying drawings of embodiments of the present invention.

BRIEF DESCRIPTION OF THE DRAWINGS

In the drawings:

FIGS. 9A-C are schematic illustrations of three alternative embodiments of the front and rear lens elements of the rimless glasses of FIGS. 1-8, shown from behind.

FIGS. 10A-C are corresponding schematic illustrations of the three alternative embodiments of the front and rear lens elements of FIGS. 9A-C, shown from the side.

DETAILED DESCRIPTION OF THE INVENTION

Example 1

Figure 1:
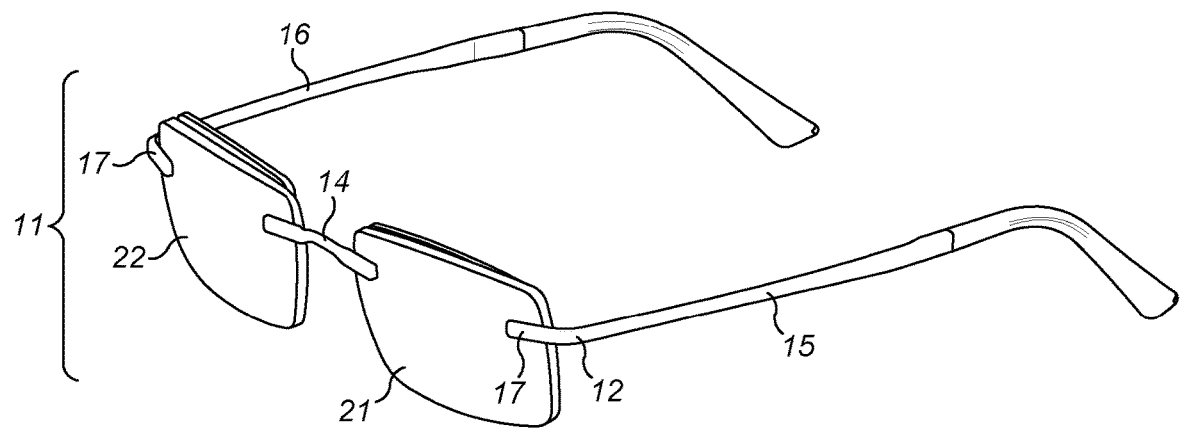
FIG. 1 is a perspective view from above and to the left-hand side of the front of a pair of rimless glasses in accordance with a first embodiment of the present invention, which comprises two variable focal length lenses mounted to a frame.

A pair of rimless glasses 11 in accordance with a first embodiment of the present invention is shown in FIGS. 1-4. The glasses 11 comprise two variable focal length lenses 21, 22 of the kind that consist of two solid, optically clear lens elements that are arranged one in front of the other in the direction of viewing through the lens (indicated by axes z in FIG. 3 for each of the lenses 21, 22) and are slidable relative to one another in a direction transverse the direction of viewing (indicated by axis x in FIGS. 2 and 8) for varying the focal length of the lens.

Variable focal length lenses of this kind are well known in the art and are often referred to generically as Alvarez lenses. Alvarez lenses are disclosed in U.S. Pat. No. 3,305,294 A, but numerous variants of this kind of lens are known such, for example, as those described in U.S. Pat. Nos. 3,583,790 A, 7,338,159 B2, 7,717,552 B2, 5,644,374 A and WO 2013/030603 A1. In general, an adjustable lens of this kind comprises two superposed lens elements, each having opposite front and rear optical surfaces that are configured to control the thickness of each lens element between the surfaces, such that when rays of light pass through both lens elements in succession, the lens causes them to converge or diverge in a manner equivalent to a spherical lens. The thickness of each of lens elements varies according to a cubic function in an x,y-plane that is perpendicular to the direction of viewing through the lens and in a manner that is complementary to the other lens element, such that the spherical optical power of the lens varies according to the relative lateral disposition of the lens elements.

A suitable equation for defining the thickness t of each lens element between its opposite front and rear surfaces is:

$$t = A\left(\frac{x^3}{3} + xy^2\right) + Dx + E \quad (I)$$

wherein D is a constant representing the coefficient of a prism removed to minimise lens thickness and may be zero; E is a constant representing lens element thickness at the optical axis z of the lens; x and y represent coordinates on a rectangular coordinate system centred on the optical axis and lying in a plane perpendicular thereto; and A is a constant representing the rate of lens power variation with relative lens element movement in the x direction, being positive for one of the lens elements and negative for the other lens element. However, as mentioned above, numerous variations on this formula are known in the art, and the present invention is not limited in this respect.

As those skilled in the art will appreciate, a single lens element of an Alvarez lens does not have an optical axis as such, but a pair of lens elements acts like a normal spherical lens, so it is possible to define the optical axis as the position that correlates with the centre of the effective spherical lens. In equation (I) above, the "optical axis" is origin of the equation which may conveniently be used to define the z-axis for aligning the lens in optical programs and the like, but it might not necessarily correspond to the effective optical axis of the lens.

Conveniently, one surface of each lens element is flat or formed with a regular surface of revolution, e.g. spherical, while the opposite surface has a cubic surface of the kind described above to control the thickness of the lens element. The cubic surface of each lens element may suitably, in some embodiments, be formed on a spherical base curve in a manner known in the art. The lens elements may thus be arranged to slide relative to one another along a line or along a defined path, for example an arc having a component on the z-axis and centred on the optical axis. For instance, in some embodiments, the lens elements may be arranged to slide relative to one another on an arc in the horizontal (x,z) plane relative to a user.

In the present embodiment, the two lenses 21, 22 are similar in terms of their construction, so for convenience only the left-hand lens 21 (as viewed from the perspective of a user) is described below, but the right-hand lens 22 is similar, being a mirror image of the left-hand lens 21 in medial plane extending in the z-direction intermediate the two lenses 21, 22. The following description of the left-hand lens 21 thus applies equally to the right-hand lens 22.

The variable focal length lens 21 thus comprises a front lens element 31 and a rear lens element 41. The front element 31 has a spherical or sphero-cylindrical front surface 32 and a cubic rear surface 33 of the kind described above. The rear lens element 41 has a cubic front surface 42 of the kind described above, which complements the rear surface 33 of the front lens element 31 to form an Alvarez lens, and a spherical or sphero-cylindrical rear surface 43. The front and rear surfaces 32, 33, 42, 43 of both lens elements 31, 41 may be moulded to shape or cut to shape from a preformed polished puck in a manner known in the art for optical use. In some embodiments, the front surface 32 of the front lens element 31 and the rear surface 43 of the rear lens element 41 may have the same spherical curvature and do not therefore contribute any net optical power to the lens 21. However, in some embodiments, the front surface of the front lens element 31 and the rear surface 43 of the rear lens element 41 may be mutually configured to cause convergence or divergence of rays of light passing through both elements in the manner of a spherical lens with positive or negative optical power. Thus, the lens 21 may have a fixed prescription according to a user's requirements. In some embodiments, the front and rear surfaces 32, 33 of the front lens element 31 and front and rear surfaces 42, 43 of the front lens element 41 may be shaped to split the user's prescription between the front and rear lens elements 31, 41 to allow the lens elements 31, 41 to be made as thin as possible. In this sense, the cubic surface 33, 42 of each lens element 31, 41 may be formed on a spherical base curve having a different radius of curvature from the corresponding spherical surface 32, 43. In practice, one of the front lens element 31 and rear lens element 41 may have a standard base optical power, while the optical power of the other lens element 41, 31 may be adjusted according to a user's prescription. This allows at least one of the lens elements 31, 41 to be manufactured in a range of SKUs, with only the other lens element 41, 31 requiring customisation for each user. As mentioned above, the lens elements 31, 41 may also be configured to impart an amount of cylindrical correction to light passing through the lens 21. Suitably, any required degree of astigmatism is included in the other lens element 41, 31 that is customised for the user. In a further variant, one or both of the front surface 32 of the front lens element 31 or rear surface 43 of the rear lens element may be formed with a progressive addition surface such that the base optical power of the lens varies.

Figure 2:
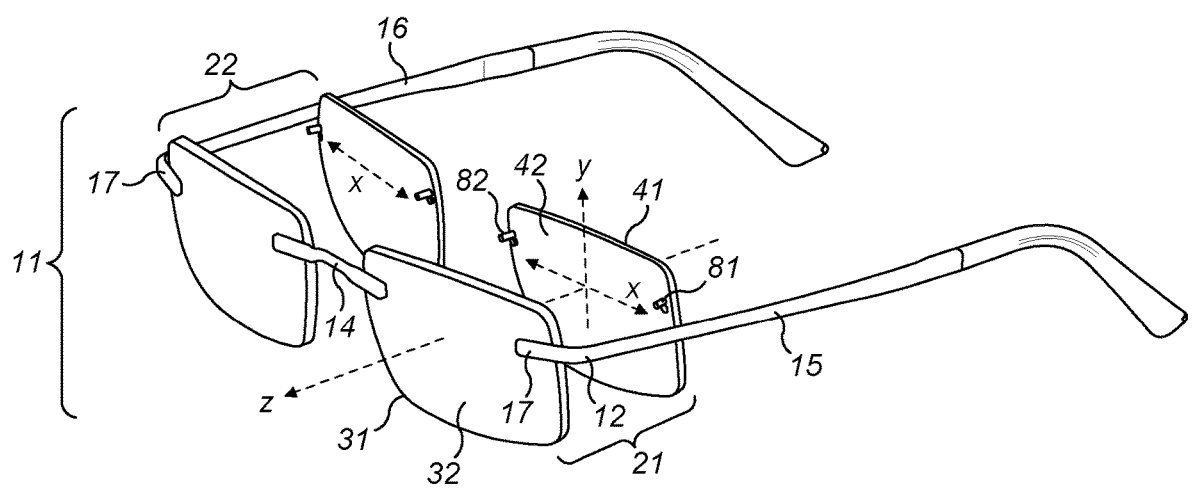
FIG. 2 is a perspective view from above and to the left-hand side of the front of the rimless glasses of FIG. 1 showing rear lens elements of the variable focal length lenses detached from cooperating front lens elements.
Figure 3:
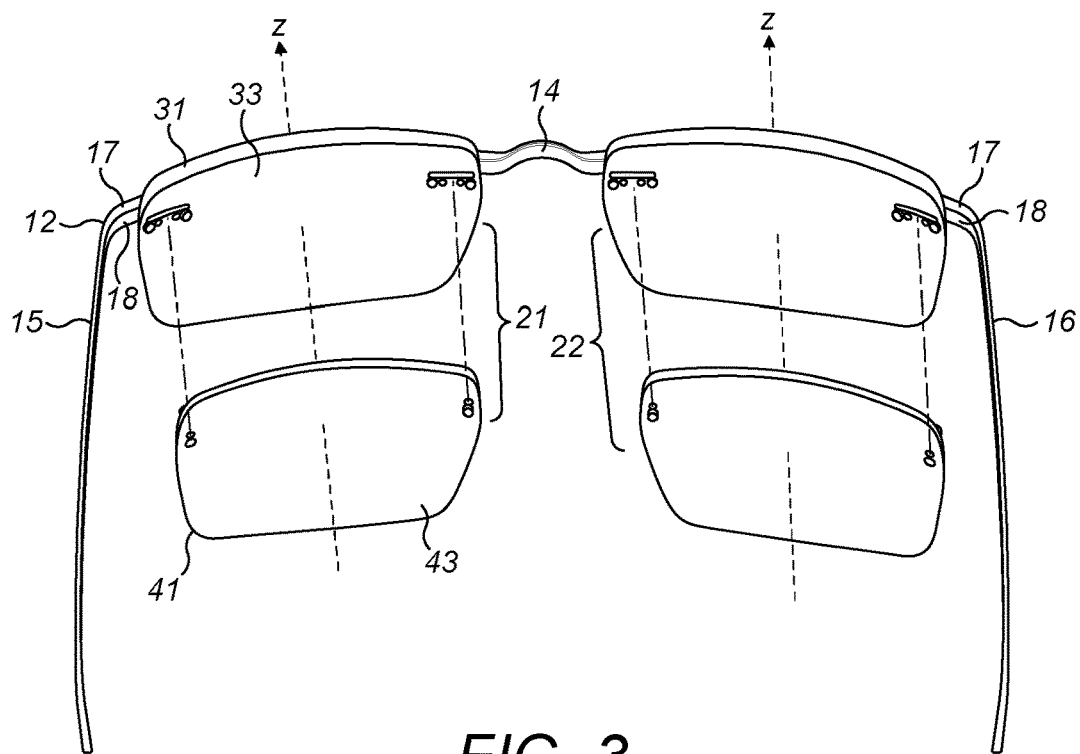
FIG. 3 is a perspective view from above of the rear of the rimless glasses of FIGS. 1 and 2 with the rear lens elements detached.
Figure 8:
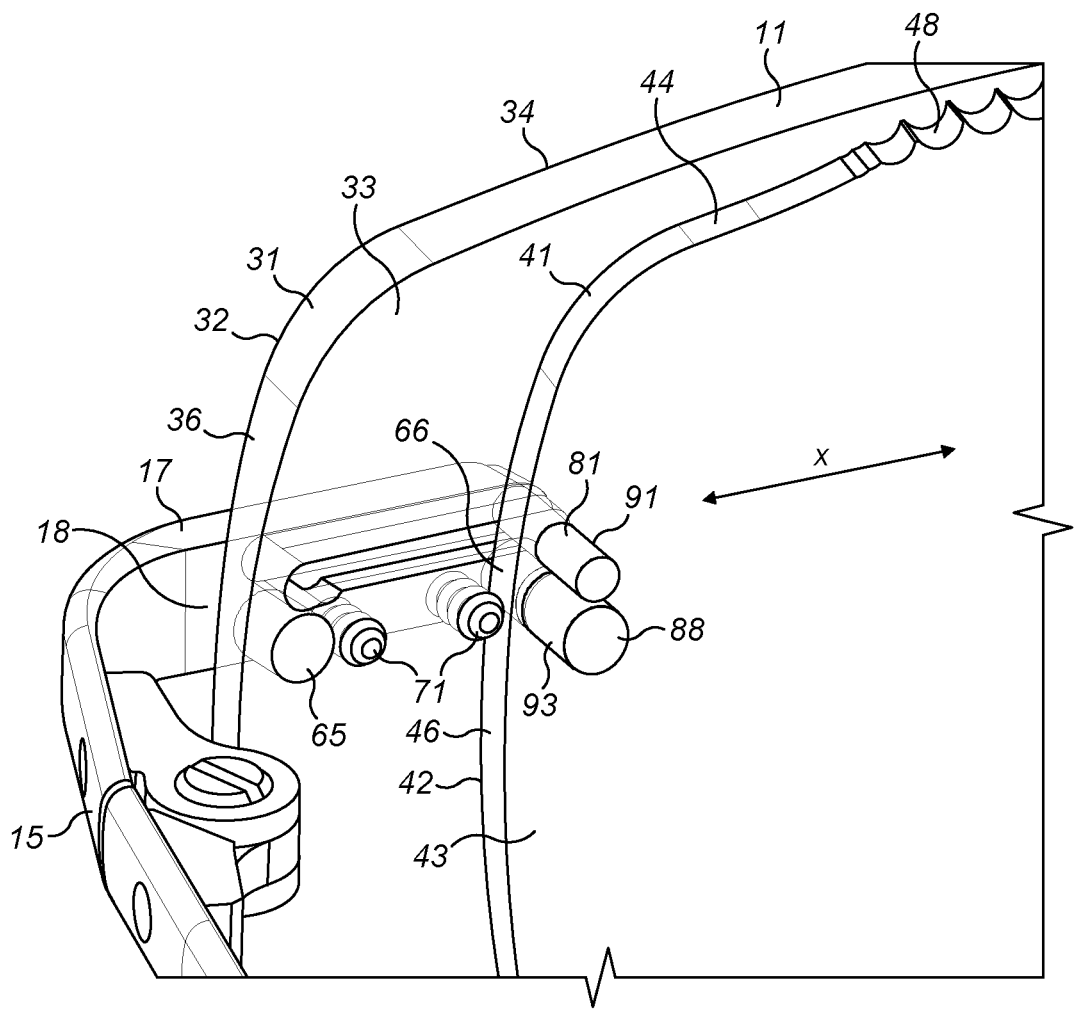
FIG. 8 is an enlarged view from above and to the left-hand side of part of the rear of the rimless glasses of FIGS. 1-7, showing attachment of a left-hand side temple arm to the left-hand front lens element and a region of increased friction on a top edge of the rear lens element to facilitate manual operation of the lens.

As described above, the lens elements 31, 41 are configured such the net optical power of the lens 21 varies according to the relative lateral disposition of the lens elements 31, 41 on a transverse axis x as shown in FIGS. 2 and 8 that extends across the direction of viewing z. Suitably, the additional optical power provided by the lens elements 31, 41 may vary in the range 0-2 dioptres to provide an additional power suitable for correcting presbyopia in addition to any fixed base spherical and/or cylindrical power of the kind described in the previous paragraph. A problem with Alvarez-type lenses is that the lens elements can become very thick where large ranges of optical powers are required. Thus, it may be desirable to confine the range of additional power provided by shifting the lens elements 31, 41 relative to one another to only a few dioptres. However, it will be understood by those skilled in the art that the present invention may equally be used with greater ranges of additional optical power, e.g. 0-5 dioptres, 0-6 dioptres or even 0-10 dioptres, provided one is prepared to compromise on the aesthetic appearance of the lenses 21, 22 owing to the thickness of the lens elements 31, 41 that would be necessary.

The lenses 21, 22 are mounted in a frame 12 as shown in FIGS. 1-4. The glasses 11 of the present embodiment are rimless, with the frame 12 comprising a nose bridge 14 that interconnects the two lenses 21, 22, which are fixedly secured thereto as described in more detail below, and left and right-hand temple arms 15, 16. As with the lenses 21, 22, the left and right-hand temple arms 15, 16 are mirror images of one another in the medial plane. The left-hand temple arm 15 is fixedly secured to the left-hand lens 21 and the right-hand temple arm 16 is fixedly secured to the right-hand lens 22. The lenses 21, 22 are mounted in the frame 12 such that the transverse axis x of sliding of the lens elements 31, 41 is oriented substantially horizontally relative to a user in normal use, as shown in FIG. 2. In other embodiments of the present invention the lenses 21, 22 may be mounted within a frame comprising full or partial rim portions around the lenses.

Figure 6:
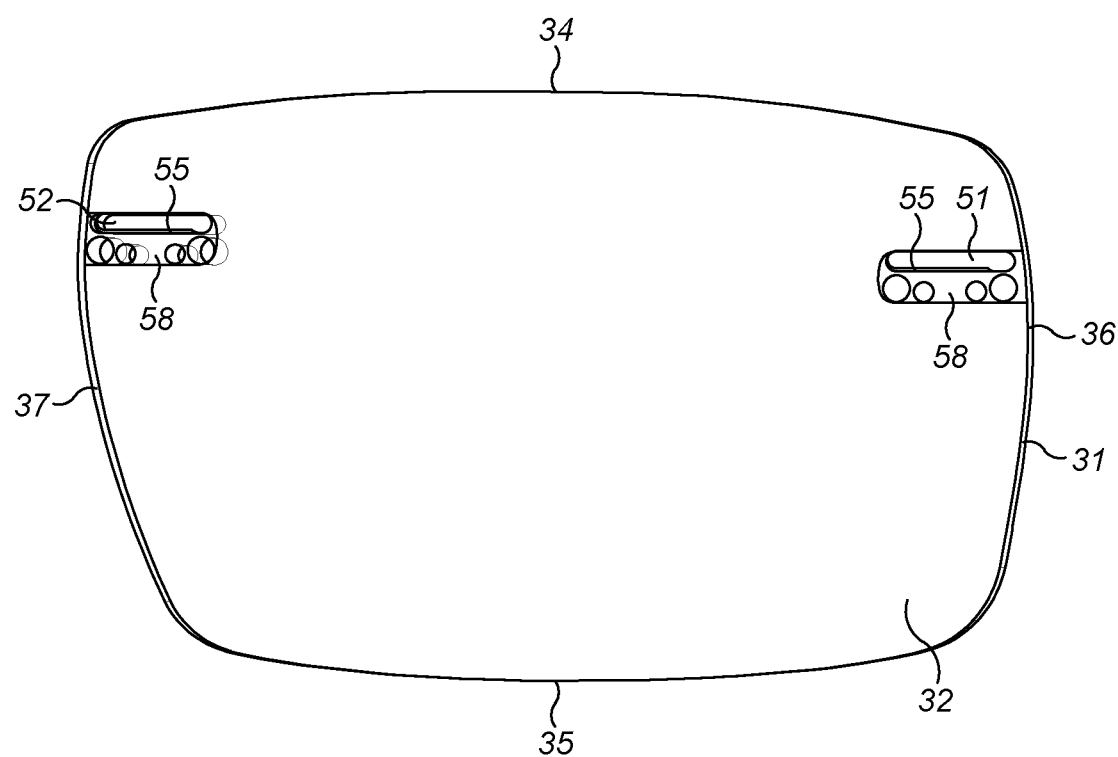
FIG. 6 is a front elevation of a left-hand front lens element of the rimless glasses of FIGS. 1-4 which is configured to mate with the left-hand rear lens element of FIG. 5.

As best shown in FIG. 6, the front lens element 31 is generally rectangular, having top and bottom edges 34, 35 respectively and left and right lateral or side edges, namely a temple side 36 adjacent the left-hand temple arm 15 and a nasal side 37 adjacent the nose bridge 14. The present invention is not limited to any specific shape of lens, and accordingly the lens elements 31, 32 may have any suitable lens shape, for example any of those that are well known in the art. Some standard ophthalmic lens shapes are more circular than others and may have less well defined sides than the lens 21 of the present embodiment. Nevertheless, those skilled in the art will have no difficulty in adapting the shape of the lens to other shapes as desired.

Figure 11:
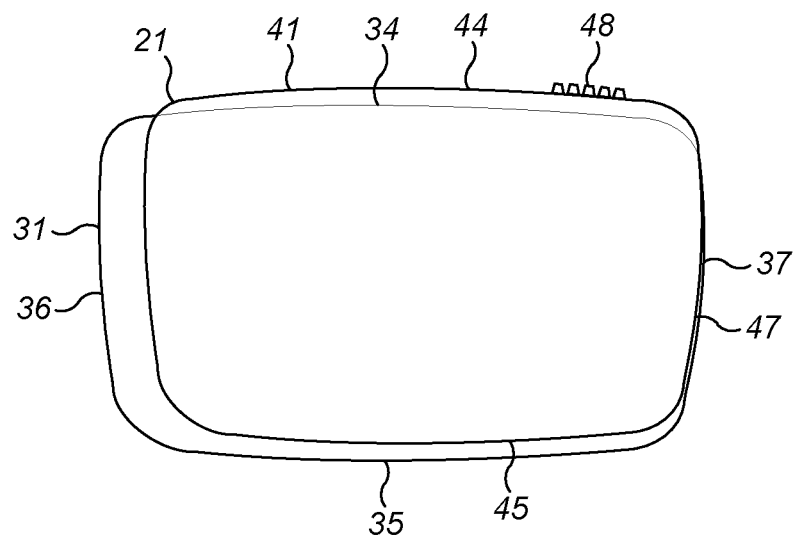
FIG. 11 is a schematic illustration from behind of the front and rear lens elements of FIGS. 9A and 10A, showing an integral region of increased friction on a top edge of the rear lens element to facilitate manual lateral sliding of the lens elements relative to one another.
Figure 12:
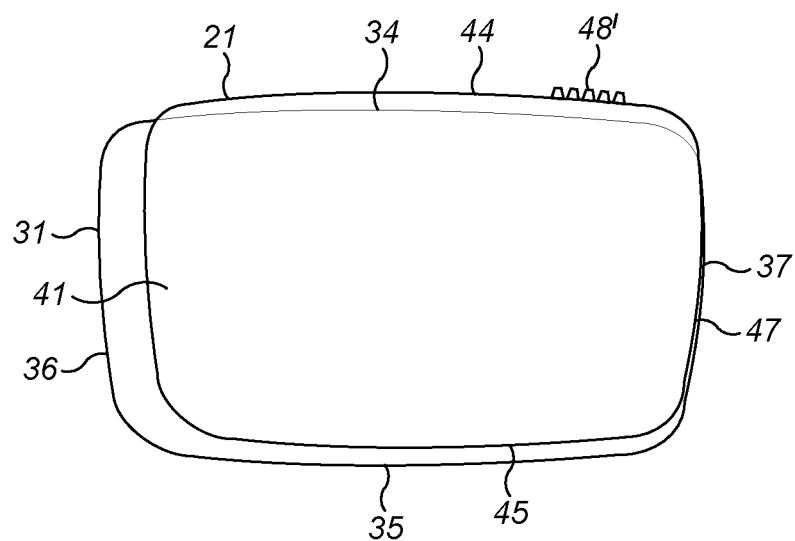
FIG. 12 is a schematic illustration from behind of an alternative embodiment of the front and rear lens elements of FIGS. 9A and 10A, showing an addition of small part to the top edge of the rear lens element which includes a region of increased friction to facilitate manual lateral sliding of the lens elements relative to one another.

The rear lens element 41 has a shape that is similar to that of the front lens element 31 as best seen in FIGS. 11 and 12, having top and bottom edges 44, 45 respectively and temple and nasal side edges 46, 47 respectively. The rear lens element 41 is shorter in the x-direction between its temple and nasal sides 46, 47 than the front lens element 31 to accommodate lateral movement of the rear lens element 41 relative to the front lens element 31 as described below for adjusting the focal length of the lens 21. The front and rear lens elements 31, 41 are mounted such that at least a portion of the top edge 44 of the rear lens element 41 protrudes slightly above at least a portion of the top edge 34 of the front lens element 31 as best seen in FIGS. 9A, 10A, 11 and 12 to facilitate manual movement of the rear lens element 41 relative to the front lens element 31 and complete removal of the rear lens element 41 from the front lens element 31, as described in more detail below. Conveniently, the top edge 44 of the rear lens element 41 may be formed with a knurled portion 48 of increased friction as best shown in FIG. 8, further to facilitate manual manipulation of the lens 21 by the user. Alternatively, the friction of at least a portion of the top edge 44 of the rear lens element 41 may be increased by creating a single or multiple raised (or lowered, or both) edges or surfaces as part of a lens edging process or within a mould tool if the lens element 41 is injection moulded; by laser etching a desired surface; chemically etching a desired surface or CNC post-machining a desired surface. In a variant of the present embodiment, instead of forming the rear lens element 41 with an integral knurled portion 48, a small part 48' of increased friction may be attached to the top edge 44 of the rear lens element 41 as shown in FIG. 12. This may be achieved by bonding on extra media (such as transparent sandpaper), embedding small ball bearings or other media in the top edge 44 or using coatings (e.g. dipped, sprayed) or by two-shot moulding (over-moulding) a high friction elastomeric (e.g. TPU) material.

In further variants of the present embodiment, the rear lens element 41 may be arranged relative to the front lens element 31 such that at least a portion of its bottom edge 45 protrudes below at least a portion of the bottom edge 35 of the front lens element 31, as shown in FIGS. 9B and 10B, or the height of the rear lens element 41 between its top and bottom edges 44, 45 may be slightly greater than the height of the front lens element 31 such that both top and bottom edges 44, 45 of the rear lens element 41 protrude beyond the corresponding edges 34, 35 of the front lens element 31, as shown in FIGS. 9C and 10C. These arrangements of the front and rear lens elements 31, 41 are equally applicable to other embodiments of the invention described below.

Figure 7:
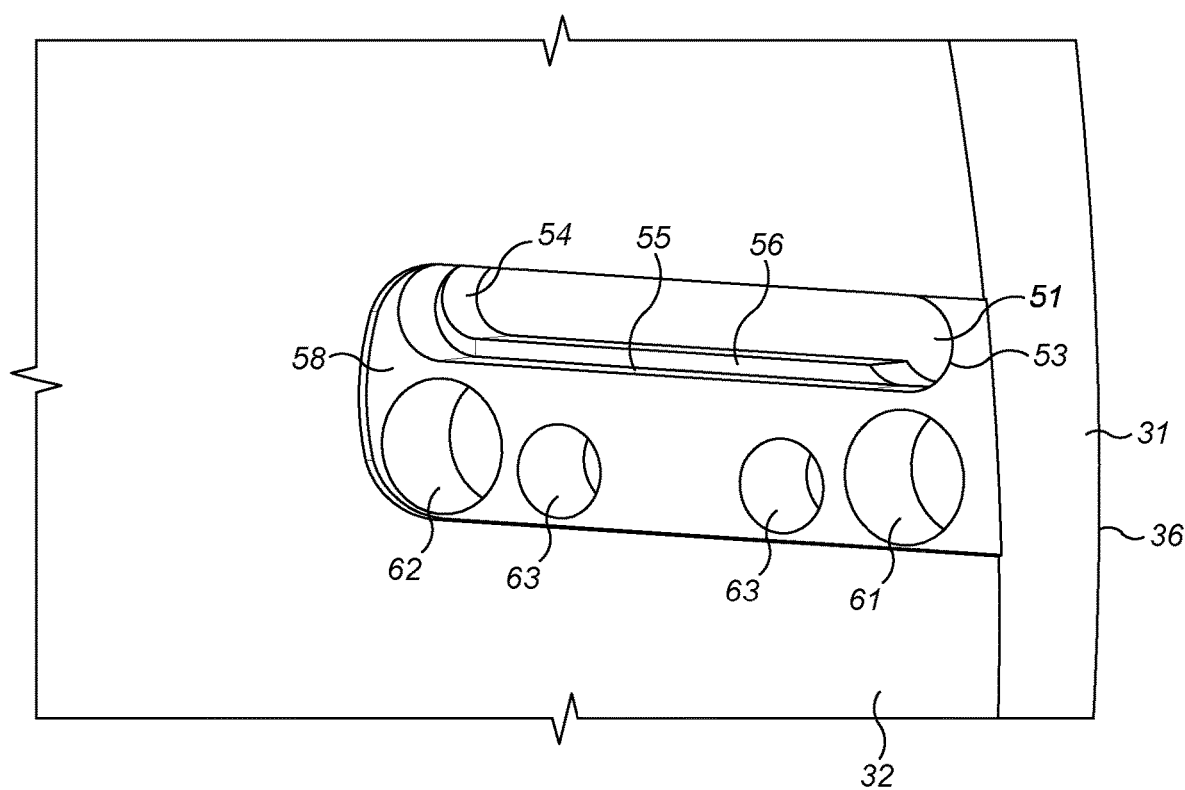
FIG. 7 is an enlarged front view to the left-hand side of part of the left-hand front lens element of FIG. 6.

As best seen in FIGS. 6 and 7, the front surface 32 of the front lens element 31 is formed with a rebate 58 juxtaposed each lateral side 36, 37 and extending partway through the front lens element 31. Within each rebate 58, the front lens element 31 is formed with a slot 51, 52 and a plurality of holes 61, 62, 63 as described below.

In some embodiments, during manufacture of the front lens element 31, the rebate 58 is cut into the front lens element 31 first and then used as a datum when cutting the slots 51, 52 and holes 61, 62, 63. This manufacturing process, whereby the rebate is used as a datum, facilitates production of lens elements having different sizes and geometries. For example, by using a rebate of a fixed size and geometry as a datum across a range of lens element sizes, thicknesses and geometries, the process of cutting the slots 51, 52 and holes 61, 62, 63 into the lens elements can be standardised and therefore does not need to be substantially changed when switching between lens element sizes.

An elongate slot 51, 52 is formed in each rebate 58; namely a temple slot 51 proximate the temple side 36 and a nasal slot 52 proximate the nasal side 37. The slots 51, 52 are of the same length and each extends fully through the front lens element 31 and extends in the transverse x direction as defined above. The slot has semi-circular temple and nasal ends 53, 54 as shown in FIG. 7. One of a top or bottom wall 55 of the slot 51, 52 is stepped as best seen in FIG. 7 for the temple slot 51 to define a retaining rib 56 that extends along the top or bottom of the slot 51 juxtaposed the rear surface 33 of the front lens element 31 from the nasal end 54 and stops short of the temple end 53. In the present embodiment, the rib 56 is formed on the bottom wall 55 of the slot, but in a variant it may be formed on the opposite top wall, which would allow the bottom surface to be flatter and deeper. The retaining rib 56 has a front surface 56.

Figure 4:
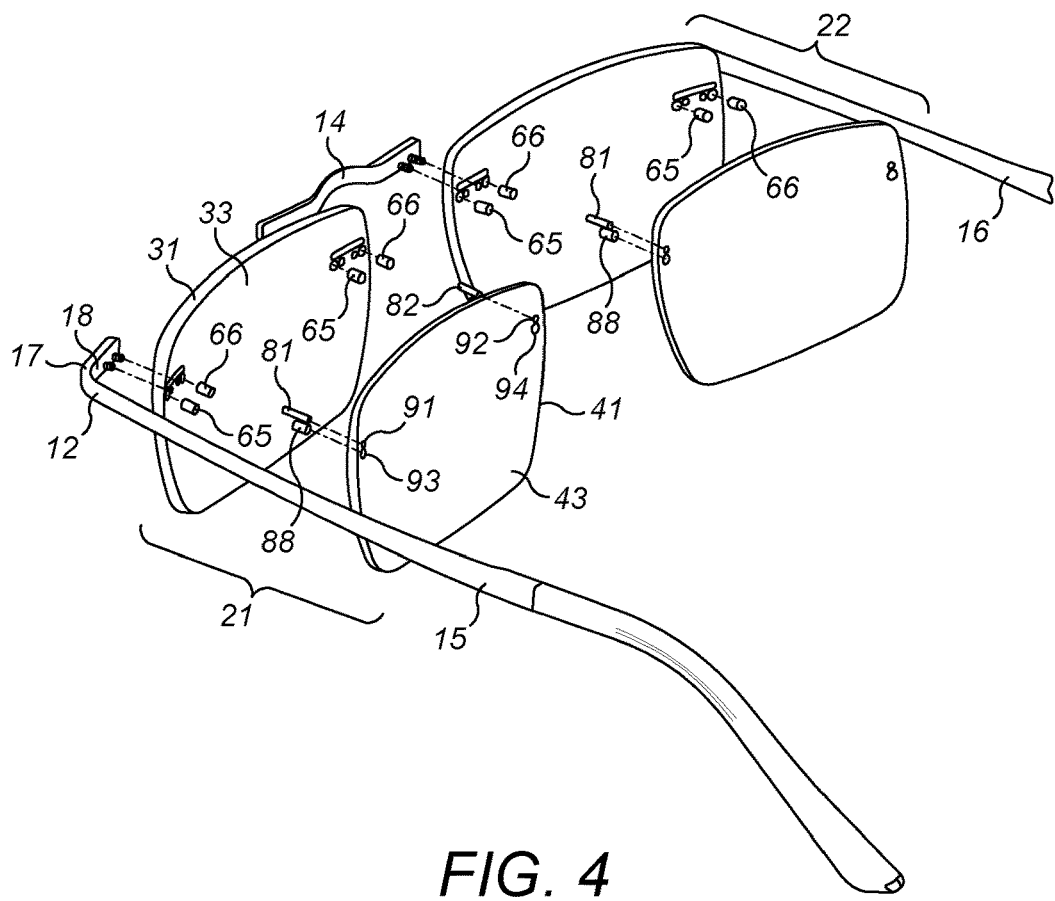
FIG. 4 is an exploded perspective view from above and to the left-hand side of the rear of the rimless glasses of FIGS. 1-3.

The front surface 32 of the front lens element 31 is rebated slightly at 58 around each of the slots 51, 52 as shown in FIGS. 6 and 7 for fixing the temple arm 15 and nose bridge 14 as described below. Within the rebate 58 the front lens element 31 is formed with two larger holes 61, 62 juxtaposed each end 53, 54 of the slot 51 and two smaller holes 63 that are positioned intermediate the larger holes 61, 62. Those skilled in the art will understand that the sizes of the holes are unimportant and in some embodiments, the holes 61, 62 and 63 may be substantially the same size. The holes 61-63 extend fully through the front lens element 31. The larger holes accommodate front permanent magnets 65, 66 respectively as best seen in FIGS. 4 and 8. The smaller holes 63 allow the temple arm 15 and nose bridge 14 to be fastened to the front lens element 31 using suitable fixings such, for example, as grooved, threaded, bumped or barbed fittings 71, as shown in FIG. 8. The fittings 71 are mounted on a rear surface 18 of an elbow portion 17 of the temple arm which fits within the rebate 58 flush with the front surface 32 of the front lens element 31. In the present embodiment the front lens element 31 is thus fixedly secured to the frame 12. Advantageously, this arrangement enables the creation of a common surface to the front surface 32 of the front lens element 31 which may vary depending on the SKU/user prescription. The temple arm 15 can then be attached to a common surface regardless of the user's prescription or base optical power of the SKU. The rear surface 18 of the elbow portion 17 and the front surface of the rebate 58 are on the same spherical radius, which defines an arcuate transverse path (e.g. in the x,z-plane as described above) along with the rear lens element 41 moves. The front lens element 31 may be attached to the nose bridge 14 by a similar arrangement to the nasal side 37 of the front lens element 31. It will also be understood that in variants of this arrangement, more than two permanent magnets 65, 66 may be fitted to the front lens element 31, e.g. by means of a third larger hole (not shown) between the two holes 61, 62 described above.

Figure 5:
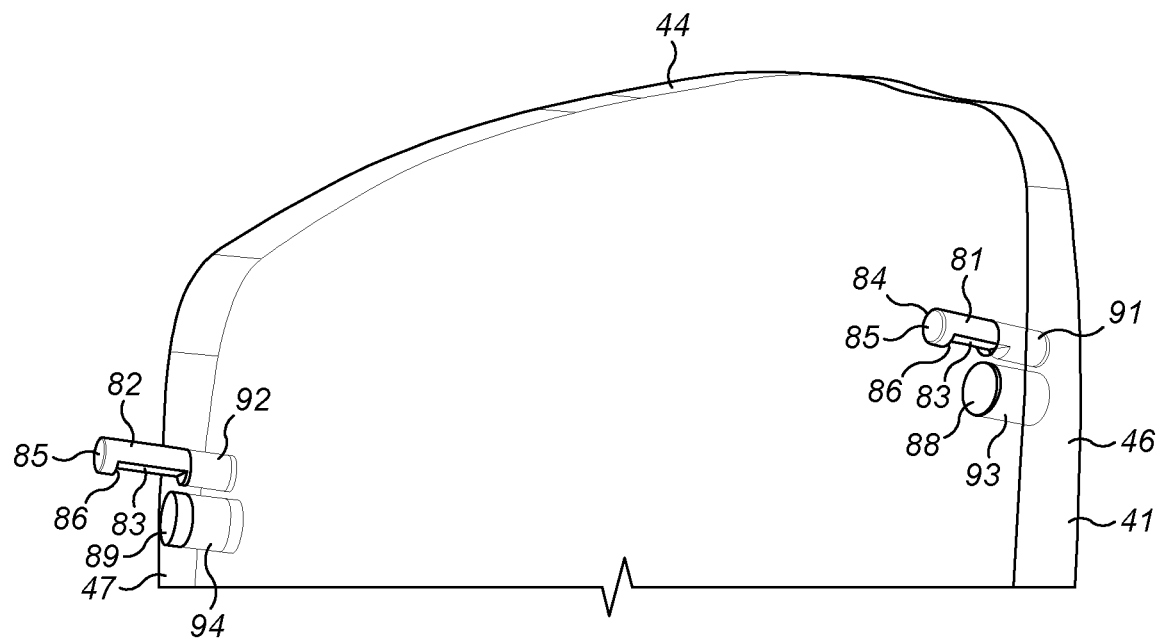
FIG. 5 is a perspective view from the left-hand side of a top half of the front of a left-hand rear lens element of the rimless glasses of FIGS. 1-4.

The rear lens element 41 is coupled to the front lens element 31 by means of two spaced cylindrical dowel pins 81, 82 which are mounted within respective recesses 91, 92 formed in the rear lens element 41 and protrude forwardly therefrom as shown in FIG. 5. The dowel pins 81, 82 are aligned with the slots 51, 52 in the front lens element 31 with one of the dowel pins 81 positioned proximate the temple side 46 of the rear lens element 41 and the other 82 being positioned proximate the nasal side 47 of the rear lens element 41. Each dowel pin 81, 82 comprises a cut-out portion 83 which defines an end portion 84 that has a circular front face 85 and a rear face 86. Each dowel pin 81, 82 extends into a corresponding one of the slots 51, 52 and is retained therein by inter-engagement of the rear face 85 of the end portion 84 on the front surface 56 of the retaining rib 56. The slots 51, 52 and dowel pins 81, 82 thus serve as guiding elements for allowing lateral movement of the rear lens element 41 in the transverse direction x across the direction of viewing z relative to the front lens element 31, whilst constraining movement of the rear lens element 41 relative to the front lens element 31 to a transverse path with a low tolerance. The dowel pins 81, 82 are dimensioned to form a close fit within the slots 51, 52 to prevent movement of the rear lens element 41 relative to the front lens element 31 in the y-direction orthogonal to the x axis and yawing of the rear lens element 41 relative to the front lens element 31 in the x,y-plane. The front face 85 of the temple dowel pin 81 engages the rear surface 18 of the elbow portion 17 of the temple arm 15 while the front face 85 of the nasal dowel pin 82 engages a corresponding rear surface of the nose bridge 14 to prevent axial movement of the rear lens element 41 relative to the front lens element 31 in the z-direction. Suitably, the rear surfaces of the elbow portion 17 and nose bridge 14 may be provided with a reduced friction bearing (e.g. PTFE, POM). Alternatively, plastic dowel pins 81, 82 could be used.

The dowel pins 81, 82 are spaced apart such that upon side to side movement of the rear lens element 41, they engage the front lens element 31 at the temple end 53 or nasal end 54 of each slot 51, 52 simultaneously. Moving the rear lens element 41 to the temple end 53 of the slots 51, 52 allows the dowel pins 81, 82 to be detached from the from front lens element 31 where the retaining rib 56 stops short of the end of the slot. It will be appreciated that in a variant of the present embodiment, the rib 56 may instead extend from the temple end 53 of the slot 51, 52 and stop short of the nasal end 54, such that the rear lens element 41 can be detached from the front lens element 31 when the rear lens element 41 is slid fully to a nasal position.

In another variant of the present embodiment, a first portion of the rib 56 may extend from the nasal end 54 of the slot 51, 52 and a second portion of the rib 56 may extend from the temple end 53 of the slot 51, 52. The first and second portions of the rib 56 thus stop short of each other to define a notch therebetween which is appropriately sized and dimensioned, such that the rear lens element 41 can be detached from the front lens element 31 when the rear lens element 41 is slid to a position midway between the nasal position and a temple position.

As described above, the front and rear lens elements 31, 41 are configured such that upon changing their relative lateral disposition the focal length of the lens 21 is varied. Suitably the front and rear lens elements 31, 41 are configured such that upon sliding the rear lens element 41 from the temple end 53 of the slots 51, 52 to the nasal end 54, the optical power of the lens 21 increases. In this way, the lens 21 may be configured to provide two modes of use; a distance mode when the rear lens element 41 is positioned at the temple end 53 of the slots 51, 52 and a reading position with increased optical power when the rear lens element 41 is positioned at the nasal end 54 of the slots 51, 52. This is in line with how the eyes move to focus from far to near, and aims to help improve the optical experience from the moving Alvarez lens arrangement. If a third magnet is provided in an intermediate position as mentioned above, the lens 21 may provide three modes of use.

As shown in FIG. 5, the rear lens element 41 is formed with two further holes 93, 94 that extend in the rear lens element 41. In the drawings, these holes are shown to extend through the rear lens element 41, but in variant of the present embodiment they may be blind holes to provide a more attractive finish. Each of these further holes 93, 94 is positioned juxtaposed a respective one of the dowel pins 81, 82 and accommodates a rear permanent magnet 88, 89. Each rear permanent magnet 88, 89 is positioned to cooperate with the two front permanent magnets 65, 66 adjacent a respective one of the slots 51, 52 in the front lens element 31. In particular, when the rear lens element 41 is positioned in the temple position each of the rear permanent magnets 88, 89 is aligned with the front permanent magnet 65 at the temple end 53 of the corresponding slot 51, 52, and when the rear lens element 41 is positioned in the nasal position each of the rear permanent magnets 88, 89 is aligned with the front permanent magnet 66 at the nasal end 53 of the corresponding slot 51, 52. The front and rear permanent magnets 65, 66; 88, 89 are oriented to attract one another to retain the rear lens element 41 in stable equilibrium in the temple and nasal positions. Intermediate the temple and nasal positions, the magnets continue to hold the front and rear lens elements 31, 41 together, but in unstable equilibrium such that the rear lens element 41 tends to want to move to one or other of the end positions.

Suitably, the front and rear magnets 65, 66; 88, 89 serve to retain and accurately position the front and rear lens elements 31, 41 in relation to each other in each mode, while allowing separation of the lens elements 31, 41 when the rear lens element 41 is in the temple position as described above, e.g. for cleaning. In particular, the front and rear magnets 65, 66; 88, 89 pull the front and rear lens elements 31, 41 together such that the front faces 85 of the dowel pins 81, 82 engage the rear surface 18 of the elbow portion 17 and nose bridge 14 respectively, which controls movement of the rear lens element 41 along the arcuate transverse path. The front and rear magnets 65, 66; 88, 89 thus locate the lens elements 31, 41 in discrete detent positions, providing positive feedback to a user when setting. When changing modes the magnitude of force can be overcome easily through the user interface which results from a combination of a tactile interface as described above, the size relationship of the front to rear lens elements 31, 41 and magnetic couplings formed by the front and rear magnets 65, 66; 88, 89. This may allow a user to adjust the optical power of the lens 21 accurately and easily.

In order to provide a "good" optical experience, the relationship between the front and rear lens elements is controlled within defined tolerance limits to eliminate or minimise unwanted motion (wobble, twisting etc. in various degrees-of-freedom). Meanwhile, to provide a good user interface experience, it is desirable to control the friction between mating surfaces of the front and rear lens elements 31, 41. Sliding friction is dependent on retention force. The strength of the magnets may be selected to optimise the sliding forces generated and the force of activation.

The rimless glasses 11 of the first embodiment thus represent a lightweight design that allows for a more traditional glazing approach as compared with other embodiments described below. The slots 51, 52 may be formed in the front lens element 31 during moulding or cutting. Meanwhile, the recesses 91, 92 for the dowel pins 81, 82 (plastic or metal) may be formed during the rear lens element 41 cutting process. The rear magnets 88, 89 are mounted directly in the rear lens element 41 in holes 93, 94 that may be formed during the rear lens element 41 cutting process. The front magnets 65, 66 are mounted directly into the front lens element 31 in holes 61, 62 that may be formed during the lens cutting process. Having the slots 51, 52 formed directly in the front lens element 31 minimises the tolerance chain and helps ensure good front/rear lens element 31, 41 alignment. The use of separate slots 51, 52 and front magnets 65, 66 allows the slots 51, 52 to be full lens element 31 thickness and allows for a wide choice of magnets to fit within the thickness of the lens element 31.

Example 2

FIGS. 13-16 illustrate a variable focal length lens 121 in accordance with a second embodiment of the invention. The lens 121 is suitable for use in a pair of glasses for correcting presbyopia and, optionally, fixed refractive errors such, for example, as myopia, hyperopia and astigmatism. Like the lenses 21, 22 used in the rimless glasses of Example 1 above, the variable focal length lens 121 of the present embodiment comprises two solid, optically clear lens elements that are arranged one in front of the other in the direction of viewing through the lens (indicated by axis z in FIG. 15) and are slidable relative to one another in a direction transverse the direction of viewing (indicated by axis x) for varying the focal length of the lens. Suitably, the lens 121 may be an Alvarez type lens and for brevity the details of such lenses which are described above in relation to Example 1 are not repeated here. The following description focuses on aspects of the second embodiment that differ from the first.

The lens 121 thus comprises a front lens element 131 and a rear lens element 141. The front lens element has a front surface 132 and a rear surface 133. The front surface is spherical or sphero-cylindrical, while the rear surface 133 is configured to be a cubic surface of the kind described above on a spherical base curve. The rear lens element 141 has a cubic front surface 142 and a spherical or sphero-cylindrical rear surface 143. In addition to the variable optical power afforded by the combination of the cubic surfaces 133, 142, the lens 121 may include a base sphere and/or cylinder power. As in the first embodiment, the front and rear lens elements 131, 141 are coupled together by guiding elements to permit reciprocal lateral movement of the lens elements on a linear or curvilinear transverse path across the z-axis for varying the focal length of the lens.

The front lens element 131 has a top edge 134, a bottom edge and two opposite lateral side edges 136, 137. When shaped for use in eyeglasses, one of the side edges 136 may be configured to form a temple side edge to be located on the temple side of a user's head, while the other side edge 137 may form a nasal side edge to be located juxtaposed the user's nose. Towards each lateral side edge 136, 137 and generally towards the top edge 134, the front lens element 131 is formed with a series of three holes that are spaced apart in the x direction. The three holes extend through the front lens element 131 and comprise a larger central hole 161 which is shaped to receive a magnetic dowel pin 181 that protrudes rearwardly of the rear surface 133 of the front lens element 131 and two smaller holes 163 that may be used to mount the lens 121 in a frame in a similar manner to that described in the preceding example. It will be understood that in full frame glasses, the smaller holes 163 would be redundant and may be omitted. The magnetic dowel pin 181 is fixedly secured in the central hole 161. In some embodiments an interference push fit may suffice to hold the magnetic dowel pin 181 firmly in place, but in some embodiments an adhesive cement may also be applied. The front lens element 131 thus carries two rearwardly extending magnetic dowel pins 181, one proximate the temple side edge 136 and the other proximate the nasal side edge 137.

Figure 13:
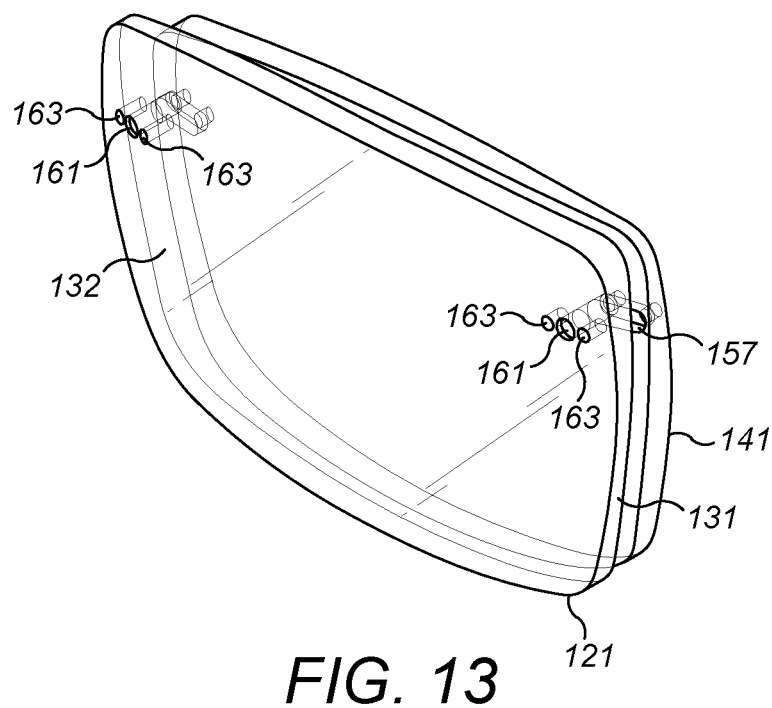
FIG. 13 is a perspective view from above and to the left-hand side of a variable focal length lens in accordance with a second embodiment of the present invention, which comprises front and rear lens elements arranged for relative lateral movement for adjusting the focal length of the lens.
Figure 14:
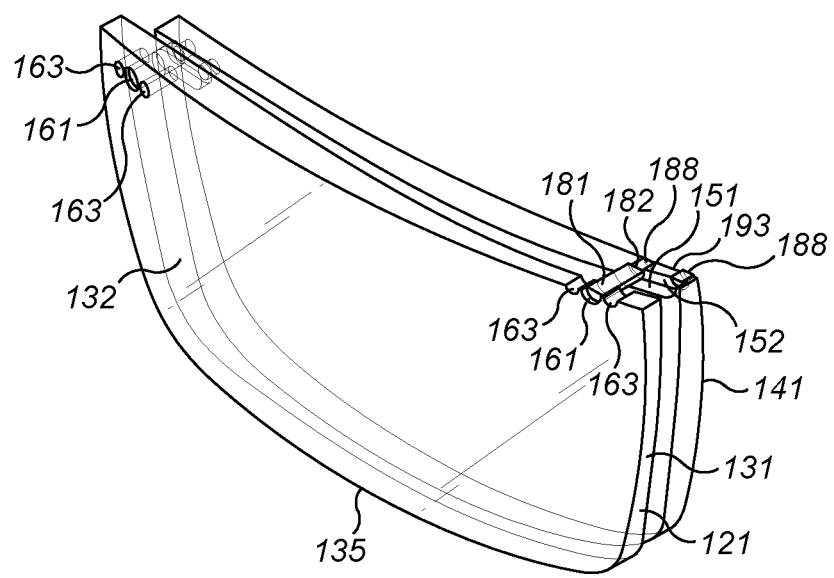
FIG. 14 is a cutaway perspective view from above and to the left-hand side of the variable focal length lens of FIG. 13, showing guiding elements and magnetic coupling elements between the front and rear lens elements.

The rear lens element 141 has a shape similar to the shape of the front lens element 131 as best seen in FIGS. 13 and 14. The rear lens element 141 thus has top and bottom edges 144, 145 and lateral side edges 146, 147. As described above with reference to FIGS. 9A-C, 10A-C, 11 and 12, the rear lens element 141 may be narrower than the front lens element 131 between its two lateral side edges 146, 147 and may be shaped and/or positioned relative to the front lens element 131 such that either the top edge 144 or the bottom edge 145 or both of the rear lens element 141 protrude beyond the corresponding edges of the front lens element 131 to facilitate manual operation of the lens 121. As in the first embodiment, the top and/or bottom edge 144, 145 of the rear lens element may comprise an integral or added region of increased friction (not shown) further to assist in operation of the lens 121.

Figure 15:
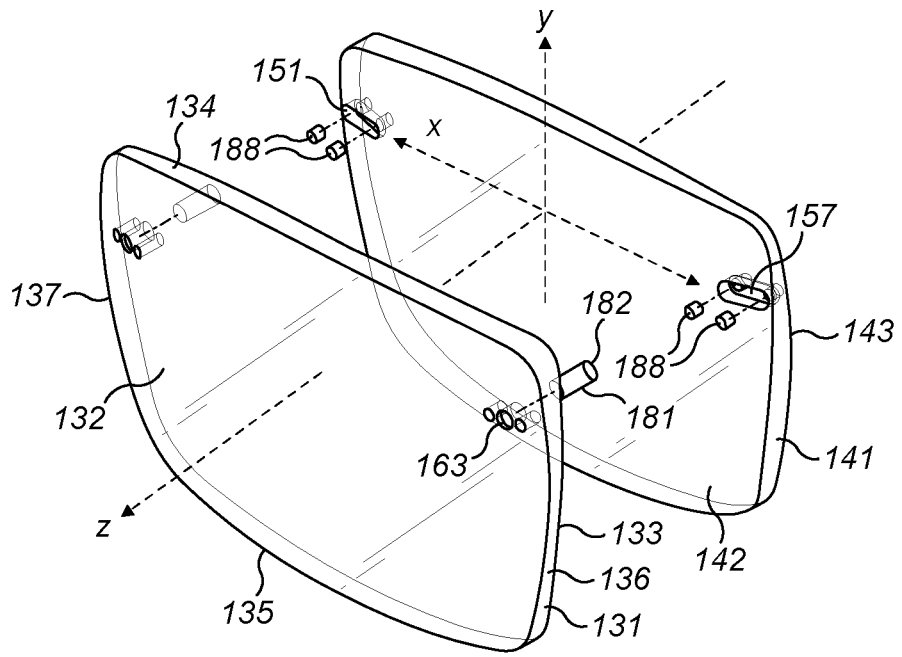
FIG. 15 is an exploded perspective view from above and to the left-hand side of the front of the variable focal length lens of FIGS. 13 and 14, showing magnetic dowel pins mounted to a rear surface of the front lens element and permanent magnets mounted in a blind slot in a front surface of the rear lens element.
Figure 16:
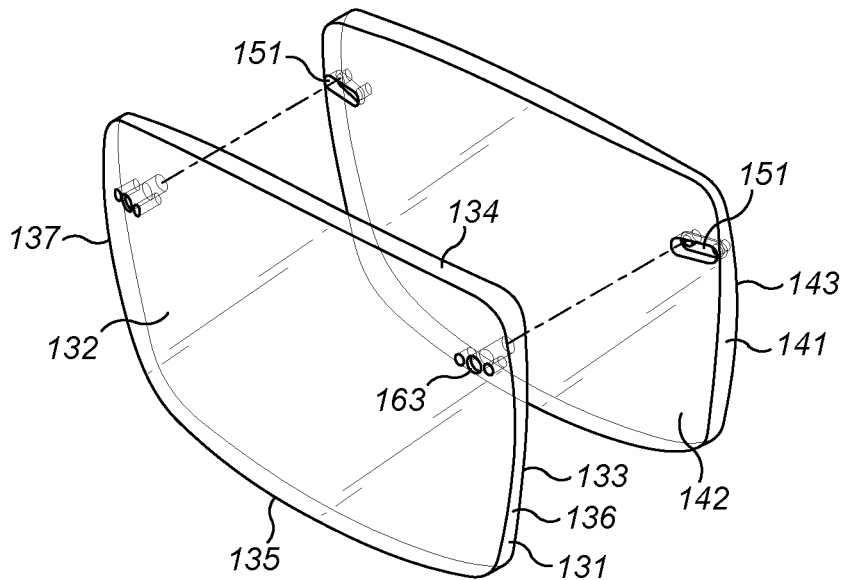
FIG. 16 is another exploded perspective view from above and to the left-hand side of the front of the variable focal length lens of FIGS. 13 and 14 with the magnetic dowel pins and permanent magnets removed for clarity.

Each of the two magnetic dowel pins 181 has a rear end portion that is received in a corresponding blind slot 151 formed in corresponding locations on the front surface 142, respectively towards the two lateral side edges 146, 147 and top edge 144 of the rear lens element 141. Each slot 151 defines a rear wall that is set back from the front surface 142 of the rear lens element 141, with a front surface 152 interiorly of the slot 151. Each magnetic dowel pin 181 has a rear face 182 that engages the front surface 152 of the rear wall of its respective slot 151 to form an axial bearing between the two lens elements 131, 141. Suitably, the front surface 152 and/or the rear face 182 may be formed with a low friction material to facilitate sliding of the one over the other. Each slot 151 has opposite temple and nasal ends 153, 154, and the magnetic dowel pins 181 form a close fit in their respective slots 151 to guide relative lateral movement of the front and rear lens elements 131, 141 along the transverse path between the two ends 153, 154, whilst preventing unwanted movement of the lens elements 131, 141 in any other direction, including the y-direction that extends between the top and bottom edges 134, 135; 144, 145 of the front and rear lens elements 131, 141 as indicated in FIG. 15. The magnetic dowel pins 181 and slots 151 are positioned and dimensioned so that the two magnetic dowel pins 181 are disposed at the temple or nasal ends 153, 154 simultaneously.

Proximate each of its temple and nasal ends 153, 154, each of the slots 151 accommodates a rear permanent magnet 188 that is received in a corresponding hole 193 that extends through the rear lens element 141 from the front surface 152 of the rear wall of the slot 151 to the rear surface 143. Thus, there are two magnets 188 within each slot 151. The rear permanent magnets 188 plug these holes 193, flush with the front surface 153 of the rear wall of the slot 151, and are arranged to cooperate with the magnetic dowel pins 181 to couple the front and rear lens elements 131, 141 together in two discrete locations, respectively when the dowel pins 181 are positioned at the temple ends 153 or nasal ends 154 of their respective slots 151. As before, the retention force between the magnetic dowel pins 181 and rear magnets 188 may be sufficiently strong to hold the front and rear lens elements 131, 141 together at any relative disposition of the two elements between the temple and nasal ends 153, 154 of the slots 151, but owing to the proximity of the magnets in those end positions, the front and rear lens elements 131, 141 may be held in unstable equilibrium between the two discrete locations defined by the ends of the slots 151, such that the lens elements 131, 141 tend to move into the discrete positions, providing haptic feedback to a user. The magnetic dowel pins 181 and rear magnets 188 thus define two modes of use of the lens 121 of the present embodiment; namely when the lens elements are arranged with the magnetic dowel pins 181 at the temple ends 153 of the slots 151 and when the lens elements are arranged with the magnetic dowel pins 181 at the nasal ends 153 of the slots 151. As with the first embodiment, the lens elements 131, 141 may be configured such that the optical power of the lens 121 is greater when the magnetic dowel pins 181 are disposed at the nasal ends 154 of the slots 151. The lens 121 may thus have a distance mode when the magnetic dowel pins 181 are located at the temple ends 153 of the slots 151 and a reading mode when the magnetic dowel pins 181 are located at the nasal ends 153 of the slots 151. The lens 121 of the present embodiment could easily be adapted to include a third magnet in an intermediate position in each slot 151 to give a third intermediate mode of use.

In the present embodiment, the magnetic couplings between the magnetic dowel pins 181 and rear permanent magnets 188 are the only means of holding the front and rear lens elements 131, 141 together. Unlike the first embodiment, the mechanical guide elements constituted by the magnetic dowel pins 181 and slots 151 have no retention elements corresponding to the rib 56 of the first embodiment.

As with the first embodiment, the magnetic dowel pins 181 and rear magnets 188 serve to retain and accurately position the front and rear lens elements 131, 141 in relation to each other in each of the aforementioned modes, while allowing easy separation of the lens elements 131, 141 for cleaning, repair or the like. The magnetic dowel pins 181 and rear magnets 188 locate the lens elements 131, 141 in discrete positions, providing positive feedback to a user when setting. When changing modes, the magnitude of force can be overcome easily through the user interface which results from a combination of a tactile interface as described above, the size relationship of the front to rear lens elements 131, 141 and magnetic couplings formed by the magnetic dowel pins 181 and rear magnets 188. This may allow a user to adjust the optical power of the lens 121 accurately and easily.

An advantage of the lens 121 of the present embodiment is that the entire lens switching mechanism is contained within the lens 121, all formed during the lens cutting process (in the case of a prescription lens). The two slots 151 may be positioned strategically on the lens 121 to allow easy switching and prevent the lens elements 131, 141 from twisting relative to one-another. In the case of a rimless variant, these can be located behind temple and nasal framework. In the case of a framed variant, these would likely be proximate the top edge 134, 144 and temple side edge 136, 146 of the front/rear lens element pair. This allows many off-the-shelf frames to be used, including rimless, half-rim and full-framed types.

Example 3

Figure 17:
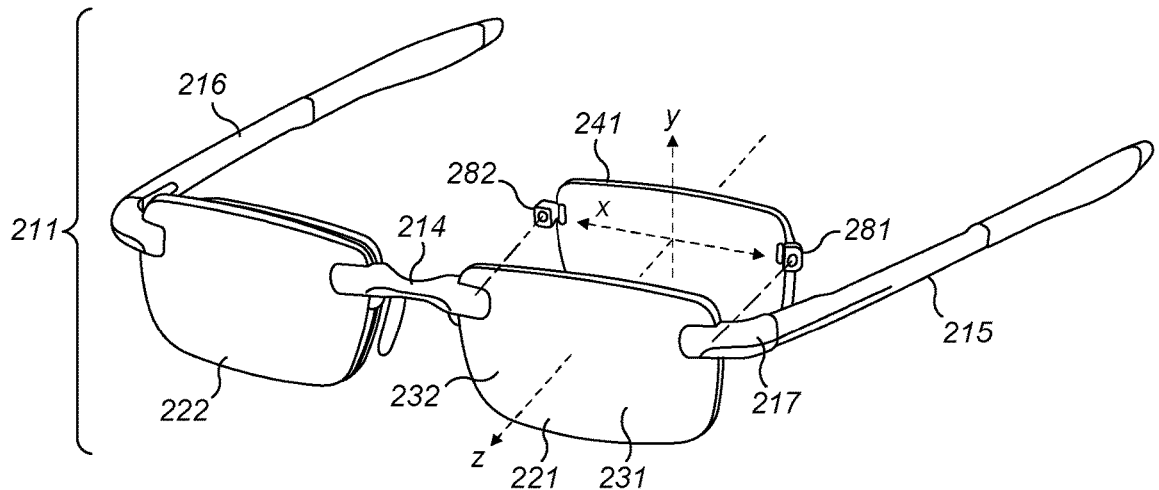
FIG. 17 is a perspective view from above and to the left-hand side of the front of another pair of rimless glasses in accordance with a third embodiment of the present invention, which comprises two variable focal length lenses of the kind having front and rear lens elements arranged for relative lateral movement for adjusting the optical power of the lens, with the rear lens element of the left-hand lens detached.
Figure 18:
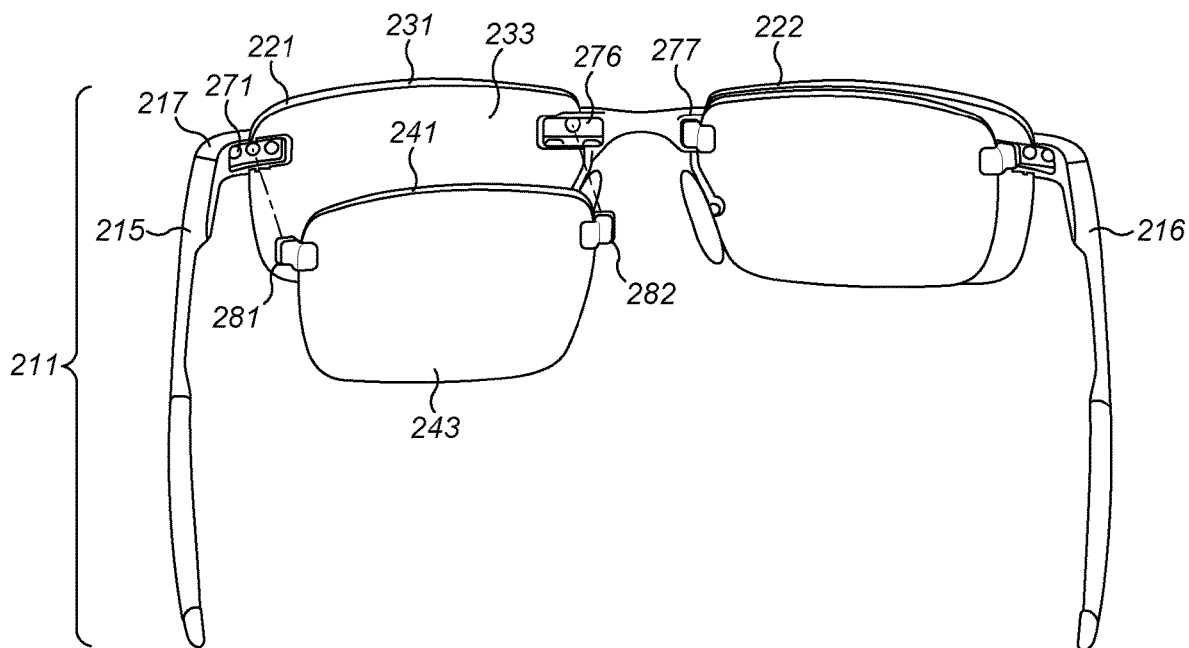
FIG. 18 is a perspective view from above of the rear of the pair of rimless glasses of FIG. 17 in accordance with the third embodiment of the present invention, with the rear lens element of the left-hand lens detached.

Another rimless pair of glasses 211 in accordance with a third embodiment of the present invention is illustrated in FIGS. 17 and 18 of the accompanying drawings. Like the glasses of the first embodiment described above in Example 1, the glasses of the present embodiment comprise two variable focal length lenses 221, 222 of the kind comprising two superposed lens elements that are arranged for relative movement in a direction transverse a direction of viewing (the z-axis in FIG. 17) for changing the focal length of the lenses. Details of such lenses are given above in relation to the first embodiment of the invention and are not repeated here in the interests of brevity. Broadly speaking, the glasses 211 of the present embodiment work in a similar manner to those of Example 1 above, except that where the lenses 21, 22 of the first embodiment provide only two modes of use for distance vision and reading respectively, the lenses 221, 222 of the present embodiment have three modes of use, including an intermediate mode as described in more detail below.

The lenses 221, 222 are mounted in a rimless frame comprising a nose bridge 214 and left- and right-hand side temple arms 215, 216 respectively (from the viewpoint of a user wearing the glasses). As shown in FIGS. 17 and 18, the lenses 221, 222 form left- and right-hand side lenses of the glasses 211, with the left-hand lens 221 being connected between the left-hand temple arm 215 and the nose bridge 214 and the right-hand lens 222 being connected between the right-hand temple arm 216 and the nose bridge 214. Since the left- and right-hand side lenses 221, 222 are essentially mirror images of one another about a medial plane, only the left-hand side lens 221 is described below, but the structure and operation of the right-hand side lens 222 is substantially the same.

Figure 19:
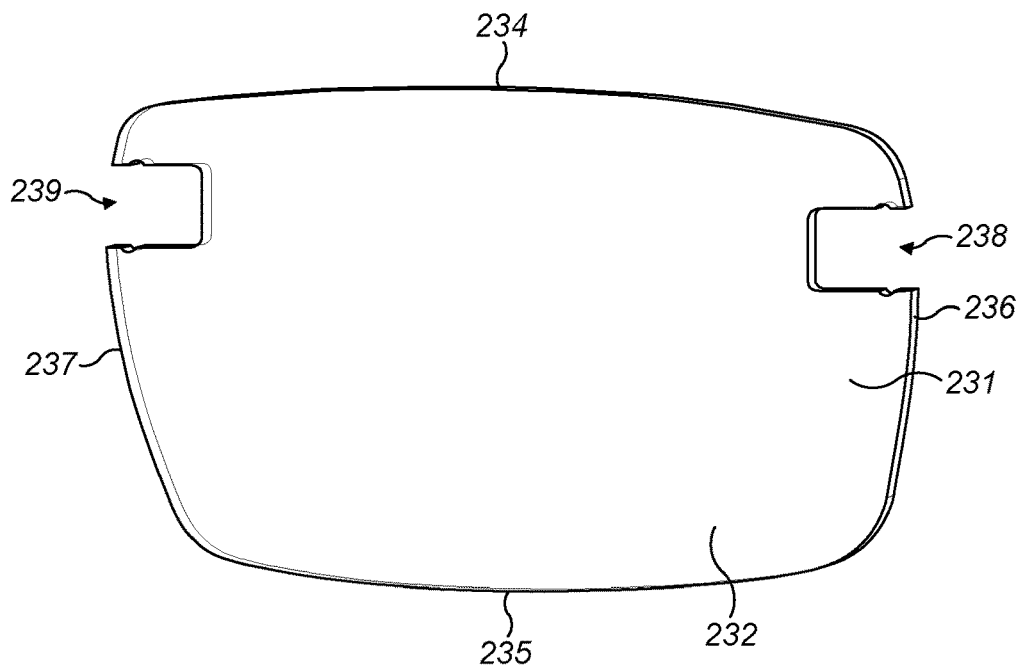
FIG. 19 is a front elevation of the front lens element of the left-hand variable focal length lens of the rimless glasses of FIGS. 18 and 19.
Figure 23:
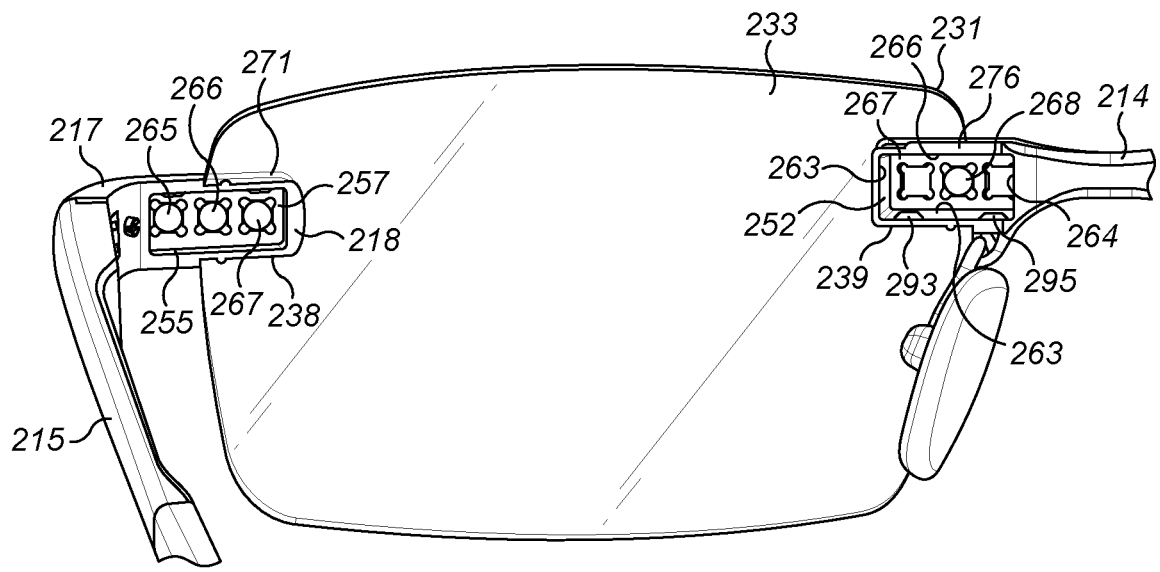
FIG. 23 is a rear elevation of the left-hand lens of the glasses of FIGS. 18 and 19 with the rear lens element removed, showing a temple bearing for the rear lens element formed in an elbow of a left-hand temple arm and a nasal bearing for the rear lens element formed in a nose bridge.
Figure 24:
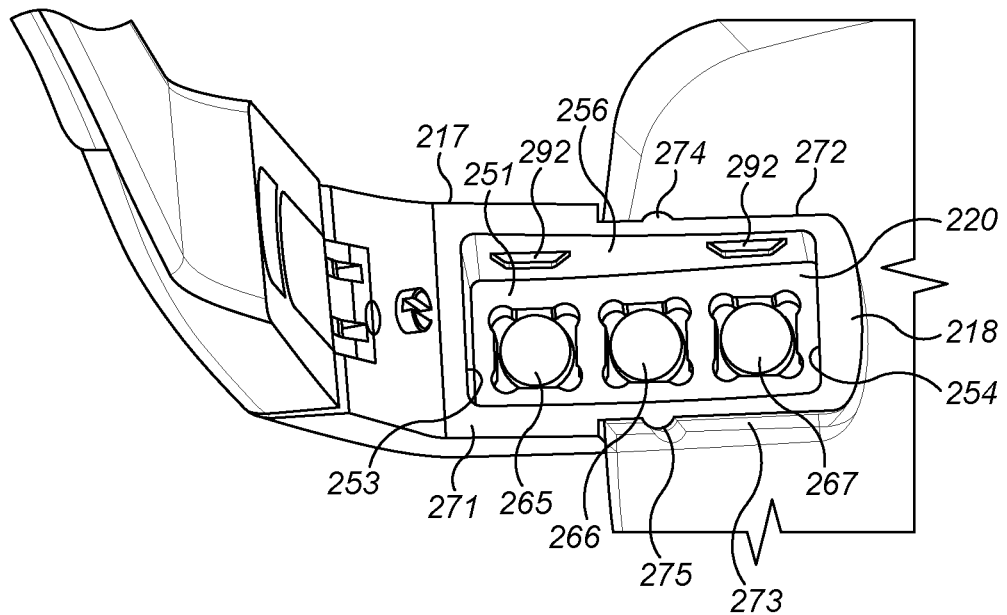
FIG. 24 is an enlarged perspective view from below and to the right-hand side of the temple bearing shown in FIG. 23.

The left-hand lens 221 comprises front and rear lens elements 231, 241, which are substantially the same as the front and rear lens elements 31, 41; 131, 141 of Examples 1 and 2 above. The front lens element 231 has a front surface 232 and a rear surface 233 and, as shown in FIG. 19, the front lens element 231 is generally rectangular, having an overall shape of the kind that is suitable for use in a pair of glasses, comprising a top edge 234, a bottom edge 235, a temple side edge 236 and a nasal side edge 237. Numerous other lens shapes may be used in accordance with the present invention. Towards the top edge 234, each of the temple and nasal side edges 236, 237 is cut out at 238 and 239 respectively to provide a fitting for the left-hand side temple arm 215 and nose bridge 214 respectively. In particular, with reference to FIGS. 23 and 24, the temple side cut out 238 receives an elbow portion 217 of the left-hand side temple arm 215. The elbow portion 217 comprises an integral temple bearing 271 having upper and lower faces 272, 273 which form a push fit in the cut-out portion 238. As best shown in FIG. 24, the upper and lower faces 272, 273 of the temple bearing 271 and the corresponding edges of the front lens element 231 in the cut-out portion 238 are shaped to form a bump-fit at 274 and 275 to fix the elbow portion 217 securely to the front lens element 231. The joint between the elbow portion 217 of the temple arm 215 and the front lens element 231 may be supplemented with an adhesive if required. The nose bridge 214 comprises two similar nasal bearings 276, 277, one at each end, for attaching the nose bridge to the front lens elements 231 of the left and right hand side lenses 221, 222 respectively in a similar manner. The nose bridge 214 is fastened to the front lens element 231 of the left hand lens 221 by means of the left-hand nasal bearing 276, which forms a push fit in the cut-out portion 239 of the front lens element 231. The nose bridge 214 is fastened to the front lens element 231 of the right hand lens 222 by means of the right-hand nasal bearing 277 in a similar manner.

The temple bearing 271 of the elbow portion 217 has a rear face 218 that is formed with a generally cuboid recess 251 that extends laterally between interior temple and nasal side walls 253, 254 as shown in FIG. 24. The cuboid recess 251 also has interior bottom and top walls 255, 256 and an interior front wall 257 that is set forwards of the rear face 218. The temple bearing 271 is formed with three spaced recesses that extend forwardly from the front wall 257, each of which accommodates a front permanent magnet 265, 266, 267 flush with the interior front wall 257. The holes and the magnets received in them are spaced substantially laterally between the temple and nasal side walls 253, 245, along an x-axis that extends transversely of the direction of viewing as indicated in FIG. 17, such that the group of three magnets comprise a front temple magnet 265 proximate the temple side wall 253, a front nasal magnet 267 proximate the nasal side wall 245 and a front centre magnet 266 between the front temple and nasal magnets 265, 267.

The left-hand nasal bearing 276 on the nose bridge 214 is similar to the temple bearing 217, having a cuboid recess 252 that likewise extends between interior temple and nasal side walls 263, 264 and has interior top and bottom walls 265, 266 and a front wall 267. The front wall 267 of the nasal bearing 276 on the nose bridge 214 is formed with three transversely spaced recesses as best seen in FIG. 23, but in the present embodiment only the centre recess accommodates a front permanent magnet 268 flush with the front wall 267, while the recesses adjacent the interior temple and nasal side walls 263, 264 are empty. In other embodiments, these recesses may also receive permanent magnets or they may be absent. The spacing between the interior side walls 263, 264 of the nasal bearing 276 is equal to the spacing between the interior side walls 253, 254 of the temple bearing, and the recesses 251, 252 are equivalent to the slots 51, 52 in the rear lens element 41 of the first embodiment described above in that they permit side-to-side movement of the rear lens element 241 relative to the front lens element 231 as described below.

Figure 20:
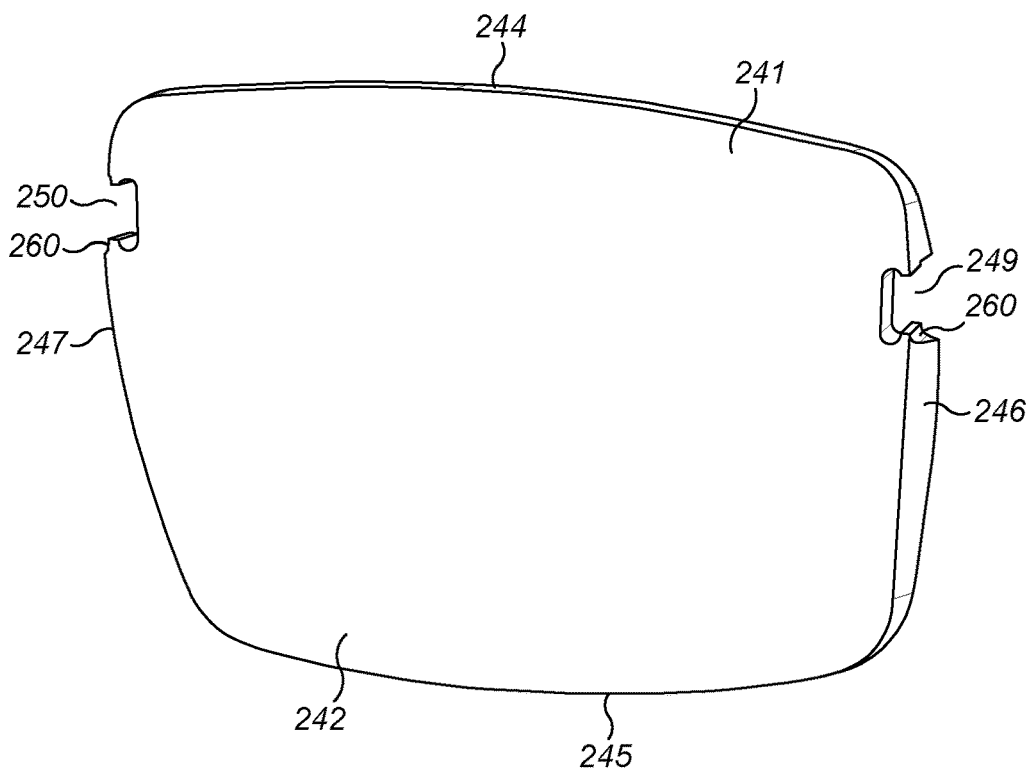
FIG. 20 is a front elevation of the rear lens element of the left-hand variable focal length lens of the rimless glasses of FIGS. 18 and 19.

The left-hand side rear lens element 241 has a front surface 242 and a rear surface 243 and, as shown in FIG. 20, is formed with a shape corresponding to the shape of the front lens element 231, with top and bottom edges 244, 245 and temple and nasal side edges 246, 247. As in the first and second embodiments described above, the rear lens element 241 has a width between its temple and nasal sides 246, 247 that is narrower than the width of the front lens element 231, as seen in FIG. 18. Similarly, the rear lens element 241 may be positioned relative to the front lens element, or shaped or sized, such that one or both of its top and bottom edges 244, 245 protrude slightly beyond the corresponding edge or edges of the front lens element 231 to facilitate manipulation of the rear lens element 241 by a user as described below. Towards its top edge 244, the rear lens element 241 is formed in each of its temple and nasal side edges 246, 247 with a female (cut-out) dovetail 249, 250.

Figure 21:
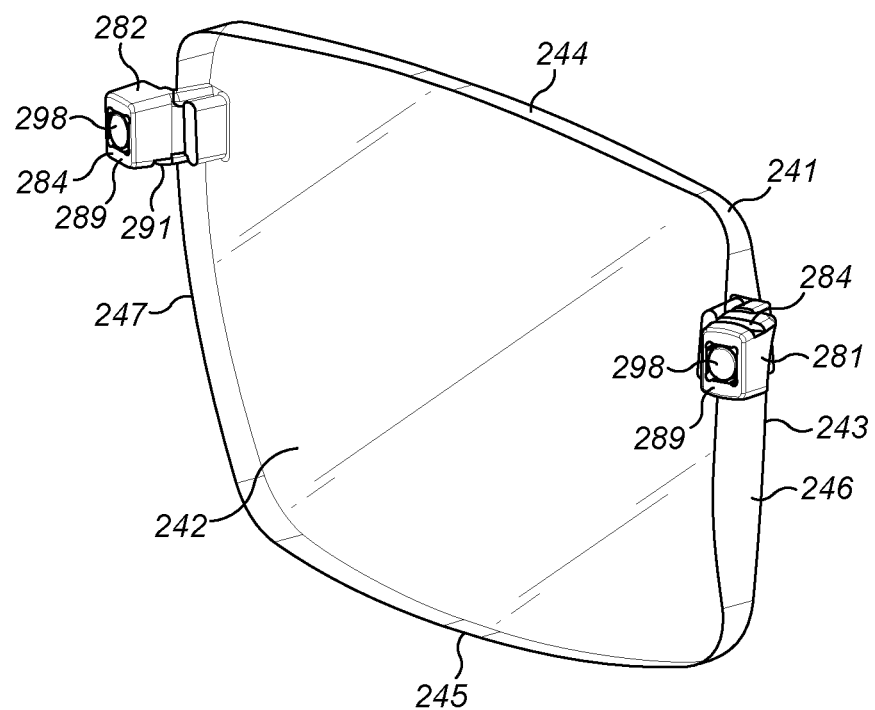
FIG. 21 is a perspective view from above and to the left-hand side of the front of the rear lens element of the left-hand variable focal length lens of the rimless glasses of FIGS. 18 and 19, showing two mounts that each incorporate a permanent magnet fastened to opposite lateral sides of the rear lens element.
Figure 22:
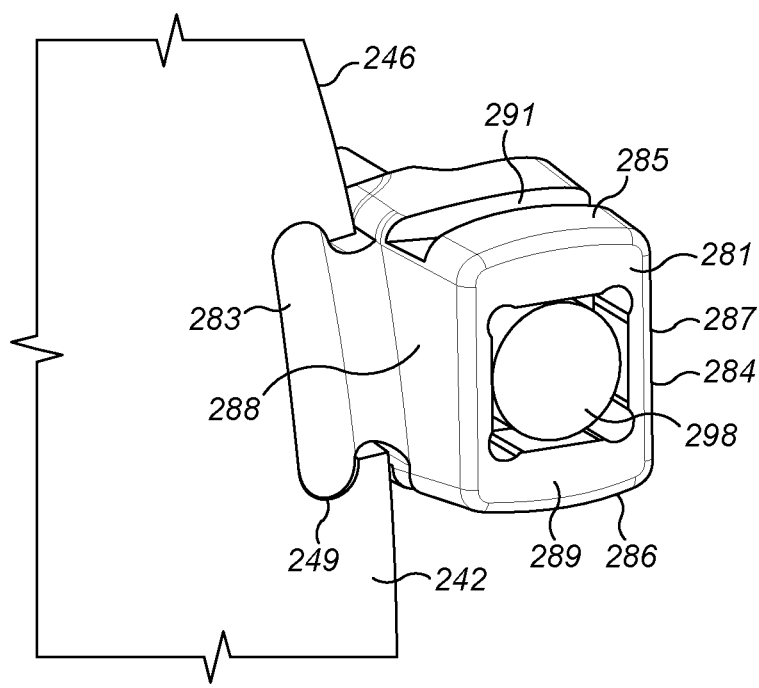
FIG. 22 is an enlarged perspective view from above and to the right-hand side of the front of a left-hand one of the mounts on the rear lens element of FIG. 21.

As best shown in FIG. 21, each of the female dovetails 249, 250 receives a mount 281, 282. Thus, the female dovetail 249 on the temple side edge 246 of the rear lens element 241 carries a temple mount 281, while the female dovetail 250 on the nasal side edge 247 of the rear lens element 241 carries a nasal mount 282. Each of the temple and nasal mounts 281, 282 comprises a male dovetail 283 as shown in FIG. 22 that is shaped to mate with the corresponding female dovetail 249, 250 to form a tight, interference fit. Additional slots 260 formed in the temple and nasal side edges 246, 247 allow the fit to the temple and nasal mounts 281, 282 to be tailored to give a secure push fit, which can be supplemented with an adhesive cement if required.

Each of the temple and nasal mounts 281, 282 comprises a generally cuboid block 284 that is disposed off to the side of the corresponding side edge 246, 247 of the rear lens element 241 and protrudes forwardly of the front surface 242 of the rear lens element 241. The temple and nasal mounts 281, 282 are received respectively in the cuboid recesses 251, 252 of the temple and nasal bearings 217, 276 on the front lens element 231 for guiding lateral movement of the rear lens element 241 relative to the front lens element 231 along a transverse path across the direction of viewing that is defined by the cuboid recesses 251, 252. Each of the blocks 284 has a front face 289 that is arranged to engage the front wall 257, 267 of the corresponding temple or nasal bearing 217, 276 to form an axial bearing therewith and upper and lower surfaces 285, 286 respectively that engage slidingly with the interior top and bottom walls 255, 256; 265, 266 of the corresponding temple or nasal bearing 217, 276, to prevent unwanted movement such as wobbling, twisting or the like of the rear lens element 241 relative to the front lens element 231. The mounts 281, 282 and bearings 271, 276 thus serve to constrain relative movement of the front and rear lens elements 231, 241 to the transverse path. The distance between the temple and nasal mounts 281, 282 is equal to the distance between corresponding portions of the temple and nasal bearings 271, 276, and each block also has a temple side surface 287 that is arranged to engage with the interior temple side wall 253, 263 of the corresponding temple or nasal bearing 217, 276 when the rear lens element 241 is moved fully to the temple side and a nasal side surface 288 that is arranged to engage with the interior nasal side wall 254, 264 of the corresponding temple or nasal bearing 217, 276 when the rear lens element 241 is moved fully to the nasal side.

As best seen in FIG. 22, the upper surface 285 of the temple mount 281 is formed with a transverse groove 291 which is configured to receive retaining nibs 292 formed on the interior upper wall of the recess 251 in the temple bearing 271 when the rear lens element 241 is moved fully to the temple side or nasal side as described in the preceding paragraph. The retaining nibs 292 serve to retain the temple mount 281 in the recess 251 when the rear lens element 241 is disposed in one or other of these two positions as a means of helping prevent accidental removal of the rear lens element 241 in use in these positions. As shown in FIG. 24, there is no retaining nib when the rear lens element 241 is disposed in a centre position between the temple and nasal positions, which means the temple mount 281 can be removed from the temple bearing 271 when the rear lens element 241 is in the centre position. As shown in FIG. 21, the nasal mount 282 is formed with a similar transvers groove 291 in its lower surface, which is likewise arranged to receive retaining nibs 293 formed on the interior bottom wall 266 of the recess 252 formed in the left-hand nasal bearing 276 when the rear lens element 241 is moved fully to the temple side or nasal side, but not in the centre position. The rear lens element 241 can thus be completely detached from the front lens element 231 in the centre position.

Each of the temple and nasal mounts 281, 282 is fitted with a rear permanent magnet 298 which is received in a recess 299 formed in the front face 289 of the cuboid block 284. The magnet 298 is oriented in the direction of the viewing axis z and is arranged to cooperate with the magnets 265, 266, 267; 268 in the corresponding temple or nasal bearing 271, 276 to form a magnetic coupling between the front and rear lens elements 231, 241. The front and rear magnets 265, 266, 267, 268 are attracted most strongly to the rear magnets 298 when the rear magnets 298 are aligned with one of the front magnets. The front and rear magnets thus serve to define three discrete positions of the rear lens element 241 relative to the front lens element 231, i.e. a temple position when the rear magnet 298 on the temple mount 281 is aligned with the temple magnet 265 on the temple bearing 271, a nasal position when the rear magnet 298 on the temple mount 281 is aligned with the nasal magnet 267 on the temple bearing 271 and a centre position when the rear magnet 298 on the temple mount 281 is aligned with the centre magnet 266 on the temple bearing 271. The rear magnet 298 on the nasal mount 282 is attracted to the rear magnet 268 in the nasal bearing 276 when the rear lens element 241 is disposed in the centre position. As in the first and second embodiments described above, the strength of the front and rear magnets 265, 266, 267, 268, 298 is sufficiently strong to hold the front and rear lens elements 231, 241 together stably, while allowing them to be slide manually between the temple, centre and nasal positions described above and to enable the rear lens element 241 to be detached in the centre position when required, for example for cleaning.

The strength of the magnetic coupling between the front and rear magnets 265, 266, 267, 268, 298 defines the haptic experience of a user when manipulating the rear lens element 241 between the discrete positions. Since the strength of the retention force generated by the magnets is greatest when the magnets are aligned, the user is able to feel when the rear lens element 241 is in one of the discrete locations through his or her fingers. In this sense, the spaced magnets 265, 266, 267 in the temple bearing 271 serve to provide a series of three detents. In some embodiments, the centre magnet 266 may be stronger than the temple and nasal magnets 265, 267 so the user is able to feel when the rear lens element 241 is disposed in the centre position, to help the user select the central position without easily overrunning to the outer positions. In the present embodiment, the magnets 265, 266, 267 are arranged such that the centre position generates a larger retention force than the temple or nasal positions. In other embodiments, this effect may be achieved by using multiple magnets, different shape magnets, or magnets with different grades (e.g. N52, N48, N35 where higher numbers give a higher pull force for the same size/shape of magnet). It is also envisaged that this could be achieved by other (non-magnetic) means, such as bump fits, leaf springs and so on between the front and rear lens elements 231, 241.

The magnetic couplings between the front and rear lens elements 231, 241 thus define three distinct modes of use as compared with only two modes in the first and second embodiments described above. As described in Examples 1 and 2, the front and rear lens elements 231, 241 of the present embodiment may conveniently be arranged such that the optical power of the lens 221 increases from the temple position, through the centre position to the nasal position such that the lens 221 provides, for example, a distance vision mode in the temple position, an intermediate "office" mode (e.g. for using a computer) in the centre position and a reading mode in the nasal position. Suitably, the Alvarez components of the front and rear lens elements may produce no additional optical power in the distance mode beyond any base spherical or cylindrical power built in to the lens elements. In the reading mode, the front and rear lens elements 231, 241 may be configured and positioned to provide an additional optical power of, say, +2 dioptres over and above any base power. In the centre position, the front and rear lens elements 231, 241 may be configured and positioned to provide an additional optical power of, say, +1 dioptre. Of course, these optical powers are given purely by way of example and the skilled person would be able to adapt the present embodiment to provide different amounts of additional optical power in the different discrete positions of the lens elements.

Example 4

Figure 25:
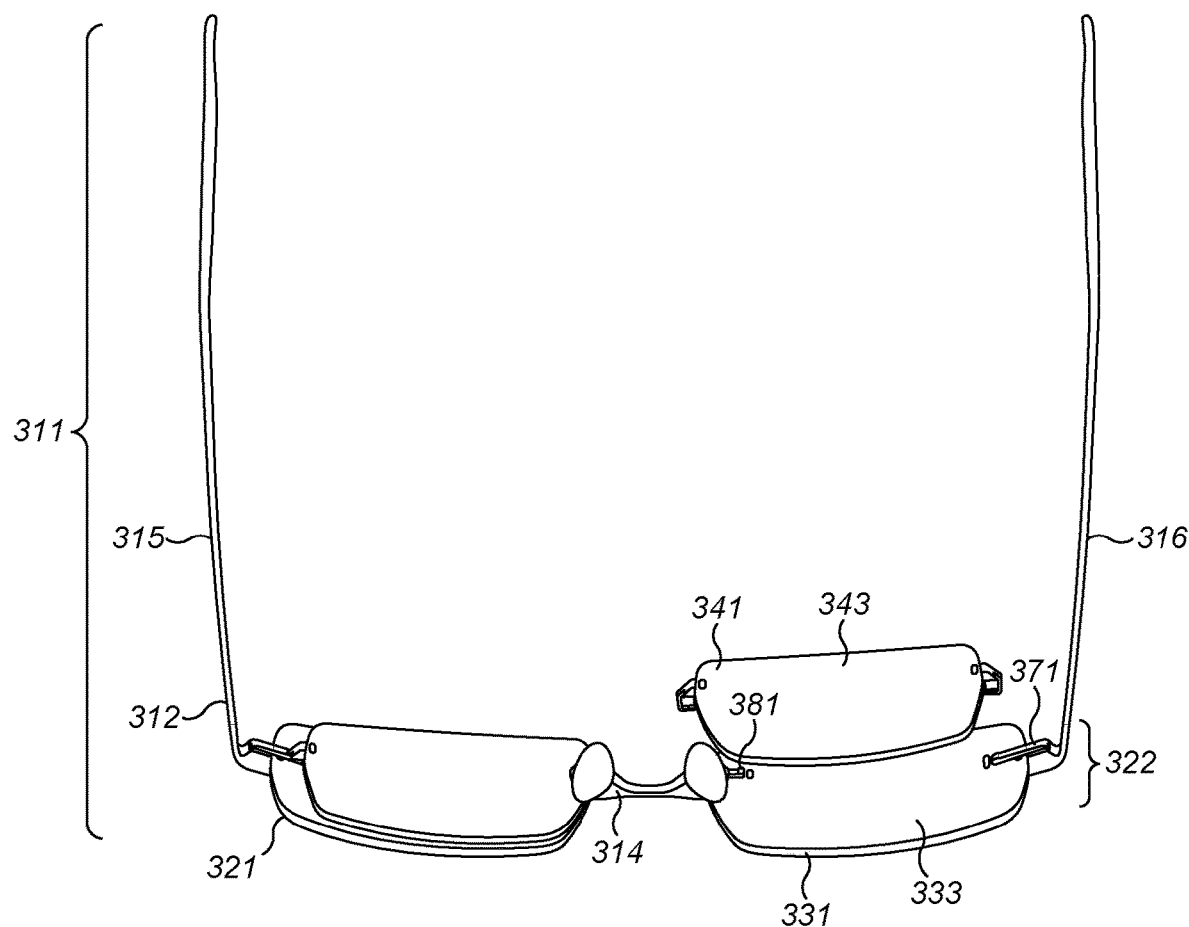
FIG. 25 is a perspective view from the rear of the bottom of a pair of rimless glasses in accordance with a fourth embodiment of the present invention comprising two variable focal length lenses of the kind in which front and rear lens elements are laterally slidable relative to one another for adjusting the optical power of the lens, with the rear lens element of the right-hand lens shown detached from its corresponding front lens element.
Figure 26:
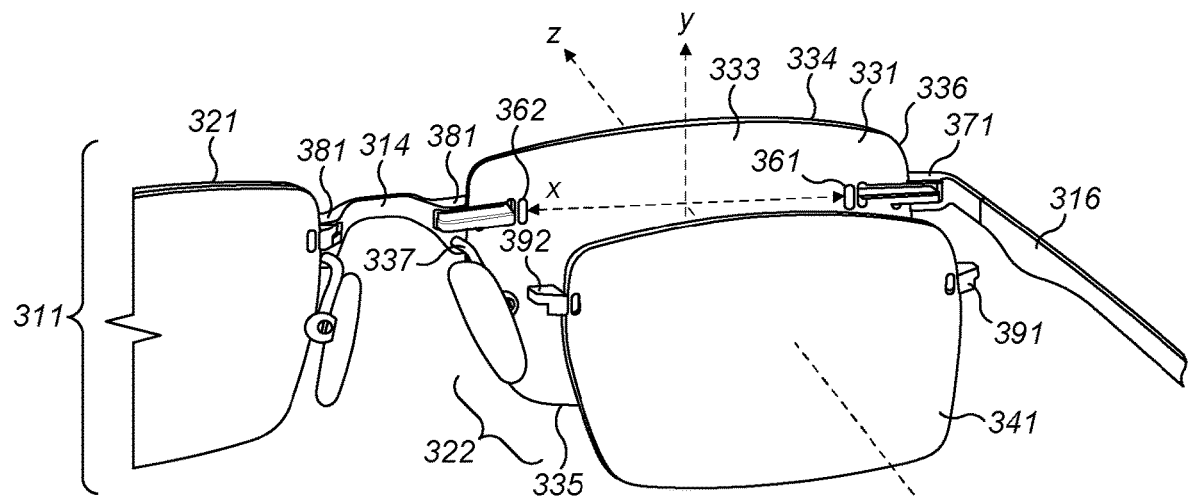
FIG. 26 is a perspective view from above and to the left-hand side of the rear of the rimless glasses of FIG. 25 with the right-hand rear lens element shown detached from its corresponding front lens element.

A fourth embodiment of a pair of rimless glasses 311 in accordance with the present invention is illustrated in FIGS. 25 and 26. In some respects, the glasses 311 of the present embodiment are similar to the glasses 211 of the previous example. The following description focuses on the points of difference between the two embodiments, for the sake of brevity.

Like the glasses 211 of Example 3 above, the glasses 311 of the present embodiment comprise two variable focal length lenses 321, 322 that are mounted in a frame 312 having a nose bridge 314 that interconnects the two lenses 321, 322 and left and right hand side temple arms 315, 316 for wearing the glasses 311 on a user's head. As before the terms "left" and "right", "front", "back", "top", "bottom", "temple", "nasal", etc. are used from the user's perspective. The two lenses 321, 322 thus comprise a left-hand lens 321 and a right-hand lens 322. The two lenses 321, 322 are mirror images of one another about a medial plane that bisects the nose bridge 314 and, with the exception of FIGS. 29-32 only the right hand lens 322 is described. The construction and operation of the left-hand lens 321 can be assumed to be the same. FIGS. 29-32 show left-hand components of the glasses 311, but again the corresponding right-hand components can be assume to be the same, albeit a mirror image about the medial plane.

The right-hand lens 322 thus comprises front and rear lens elements 331, 341 respectively that are configured to provide a variable focal length according to the relative lateral disposition of the two lens elements 331, 341 along a linear or curvilinear transverse path which extends in an x direction orthogonal to the viewing direction z of the user, as indicated in FIG. 26. In normal use, when the user is sitting or standing with their head straight, the x- and z-axes will be oriented generally horizontally. Suitably, the variable focal length lenses 321, 322 may be Alvarez-type lenses of the kind described in detail above in relation to the first embodiment. Whilst the x-direction has been indicated as a straight line in FIG. 26 it will be understood that in most, if not all, embodiments of the present invention, relative lateral movement of the lens elements 331, 341 will follow an arcuate path corresponding to a base curve of the lenses 321, 322. Typically the arcuate path will lie in the x,z-plane. The lenses 321, 322 may have a fixed base spherical and/or cylindrical power according to a user's prescription, with or without a progressive addition, and may be adjustable to add additional spherical power according to the relative disposition of the lens elements 331, 341 for correcting presbyopia.

The front lens element 331 is generally rectangular, having top and bottom edges 334, 335 and temple and nasal side edges 336, 337 respectively. As previously mentioned, the present invention is not limited to any particular shape or size of lenses 321, 322, and is applicable to a wide variety of ophthalmic lens styles of the kind that are well known in the art and may have peripheral edges that are more or less curved than the ones shown in the accompanying drawings. Those skilled in the art would also be able to adapt the lenses 321, 322 of the present embodiment for use in half-rim or full frame glasses. The front lens element 331 has a front surface 332, which is typically spherical, and a rear surface 333 which is formed with a cubic surface as described above. The rear lens element 341 has a shape and size that matches the shape and size of the front lens element 331, having top and bottom edges 344, 345 respectively and temple and nasal lateral side edges 346, 347 respectively. In the present embodiment, the rear lens element 341 is narrower between its temple and nasal side edges 346, 347 than the corresponding dimension of the front lens element 331 to accommodate sliding movement of the rear lens element 341 relative to the front lens element 331 as described herein. At least part of the top and/or bottom edges 344, 345 may protrude beyond corresponding parts of the edges 334, 335 of the front lens element 331 and may be provided with an integral or added portion of increased friction, as described with reference to FIGS. 9A-C, 10A-C, 11 and 12 in connection with the first embodiment, to assist a user to operate the lens 322 manually.

Figure 28:
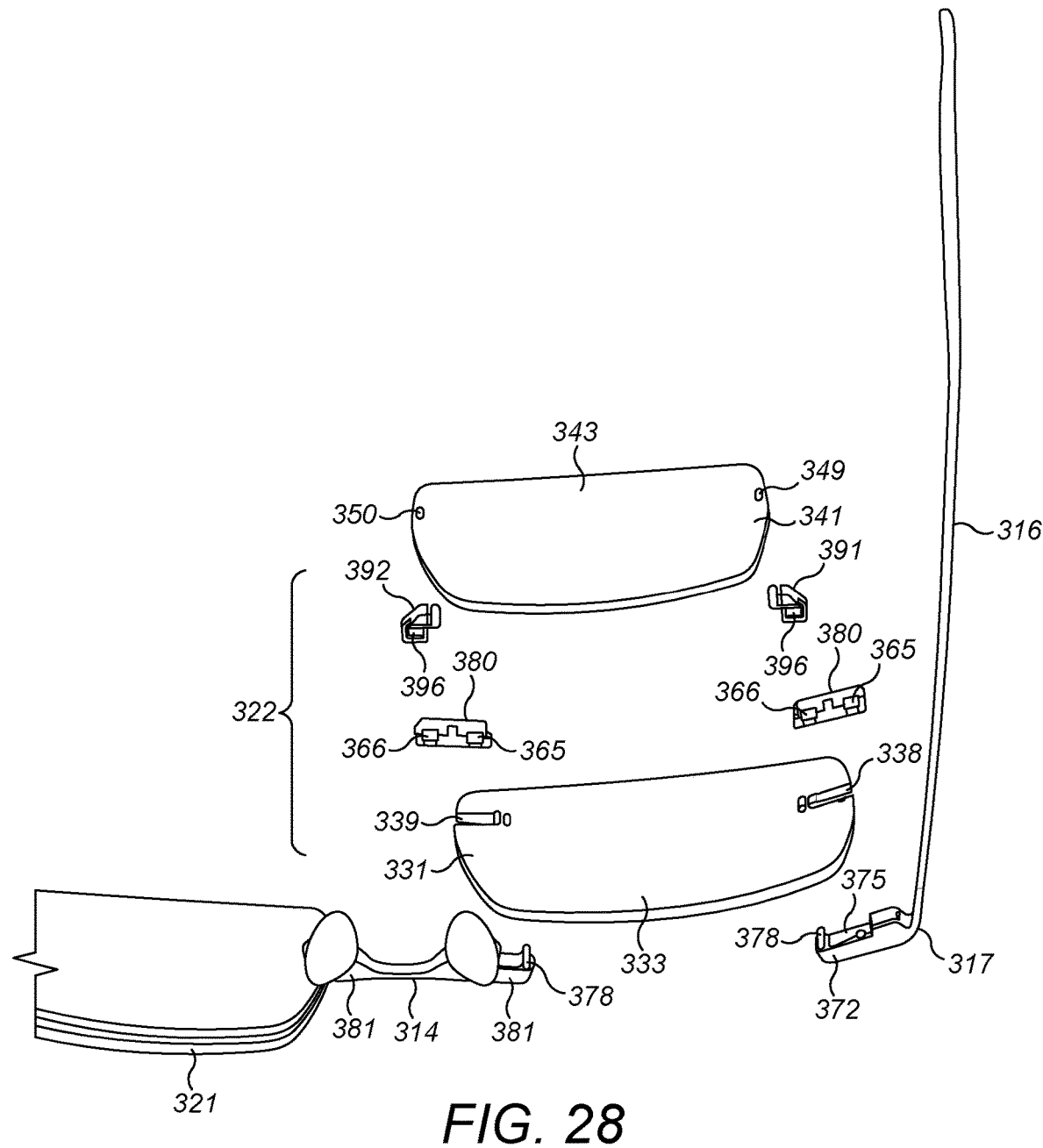
FIG. 28 is a perspective view from behind of the bottom of the rimless glasses of FIGS. 25 and 26 in which the right-hand variable focal length lens is shown exploded.
Figure 29:
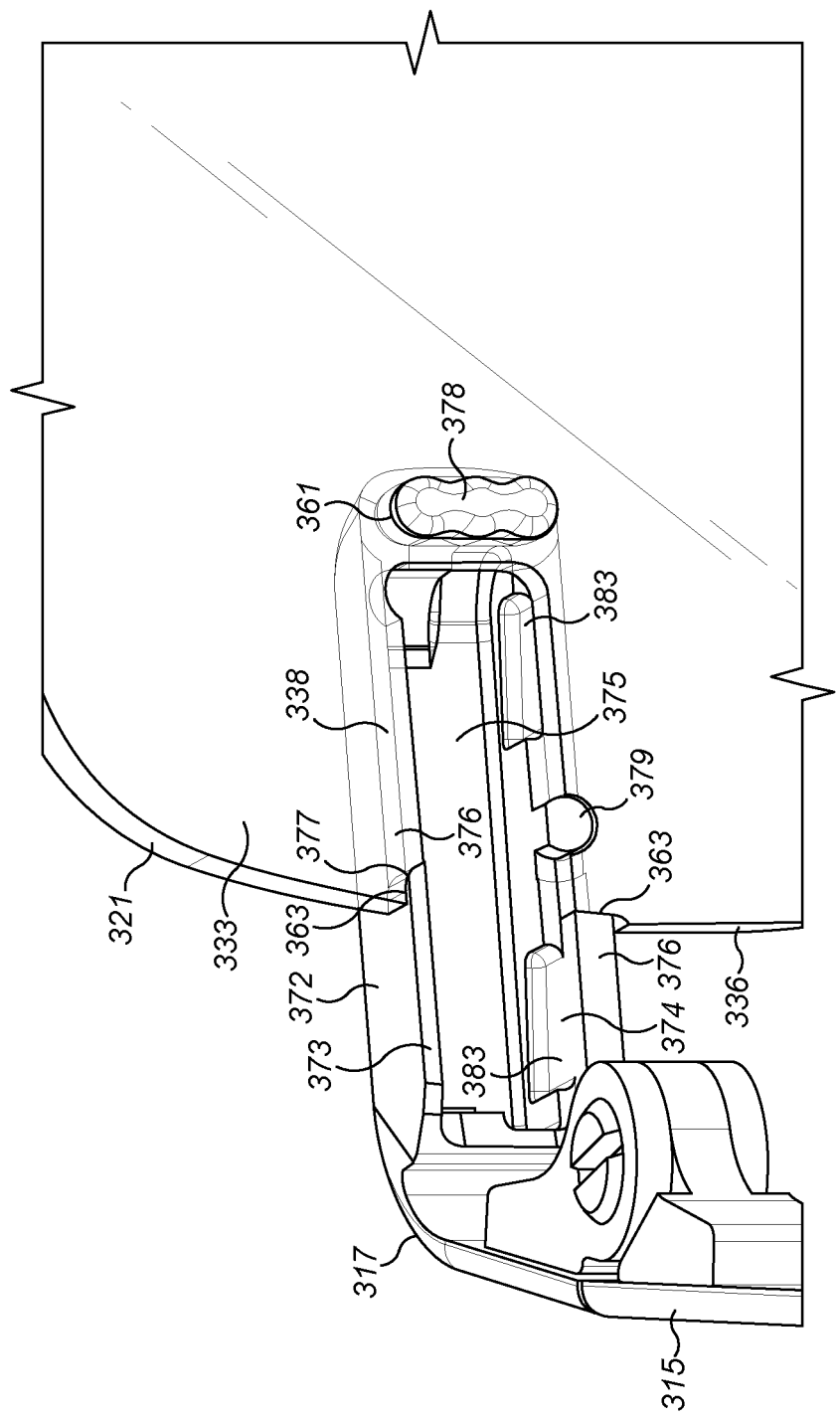
FIG. 29 is an enlarged perspective view from above of the rear of a temple elbow assembly with a mating bearing assembly removed for clarity that is attached to the left-hand front lens element.
Figure 30:
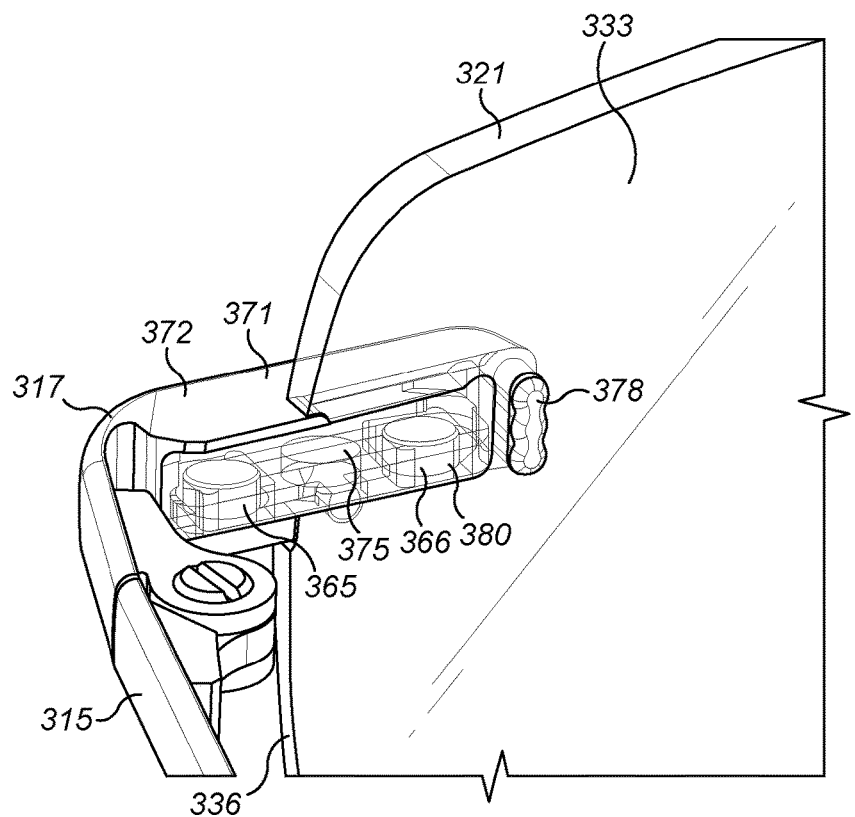
FIG. 30 is an enlarged perspective view from above and to the left-hand side of the temple elbow assembly of FIG. 29 with the bearing assembly fitted.

Towards its top edge 334, the front lens element 331 is formed on each of its temple and nasal sides with an elongate cut-out portion 338, 339 respectively. Juxtaposed an inner end (relative to the front lens element 331) of each cut-out portion 338, 339, the front lens element 331 is also formed with an aperture 361, 362 that extends fully through the front lens element 331. The position of the apertures 361, 362 can be varied to alter the thickness of the web of material between the slots). This arrangement creates a push fit between the components during the lens edging process. As best shown in FIGS. 29 and 30 with reference to the left-hand lens 321, the cut-out portions 338, 339 and apertures 361, 362 are configured and arranged to fasten elbow and nasal assemblies 371, 381 respectively to the front lens element 331. The elbow assembly 371 is connected to an elbow portion 317 of the adjacent temple arm 315. As shown in FIGS. 26 and 28 with reference to the right hand lens 322, the nasal assembly 381 is formed at a right-hand lateral end of the nose bridge 314, with a similar nose-bridge assembly 381 being provided at an opposite left hand lateral end of the nose bridge 314 for attachment to the front lens element 331 of the left-hand lens 321.

With reference to FIG. 29, the elbow assembly 371 comprises first elongate, generally cuboid block 372 that is formed integrally with or fastened to the elbow portion 317 of the temple arm 315. The block 372 has opposing upper and lower walls 373, 374 which define transversely extending, elongate recess 375 therebetween. The upper and lower walls 373, 374 define a rear face 376 of the block which is stepped forwardly at 377 intermediate temple and nasal ends of the block 372 to define flanges that engage securely in corresponding upper and lower slots 363 formed in the temple edge 336 of the front lens element 331 juxtaposed the temple end of the cut-out 338. At its nasal end, the block 372 is formed with a rearwardly protruding lug 378 that is configured to form a push-fit in the aperture 361. The block 372 is therefore firmly attached to the front lens element 331 by engagement of the lug 378 in the aperture 361 and engagement of the flanges on the upper and lower walls 373, 374 of the block 372 in the upper and lower slots 363. The depths of the upper and lower slots 363 may be adjusted during edging to ensure a good (tight) interface to retain the elbow and nose bridge assemblies 371, 381 to the front lens element 331. In the present embodiment, the block 372 is retained in place by friction alone, but in other embodiments, an adhesive may also be used. The rear face 376 of the block 372 intermediate the flanges and the lug 378 is shaped to fit contiguously against the front surface 332 of the front lens element 331. The lower wall 374 of the block 372 is formed with a rearwardly projecting secondary pin 379 between the step 377 and the nasal end as best seen in FIG. 29, which is arranged to engage in a corresponding notch formed in the front lens element 331 adjacent the cut-out portion 338 to dissipate loads applied to the front lens element 331, so it is not all concentrated at the aperture 361 and/or does not rely as much on any adhesive that is applied. The nose-bridge assembly 381 comprises a similar cuboidal block 381 as show in FIG. 28.

Figure 31:
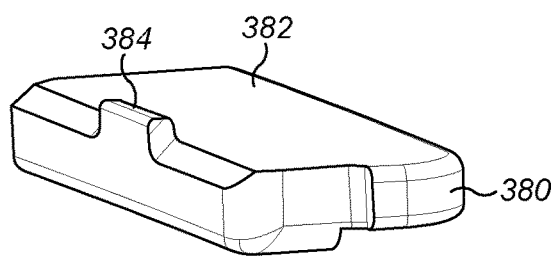
FIG. 31 is a perspective view from above and to the rear of the right-hand side of a low friction bearing forming part of the left-hand temple bearing assembly of FIGS. 29 and 30.
Figure 32:
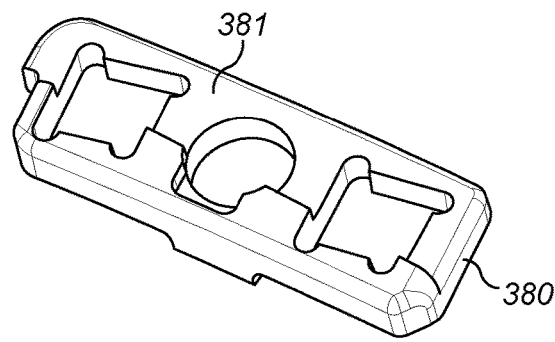
FIG. 32 is a perspective view from behind and to the left-hand side of the bottom of the low friction bearing of FIG. 31.

With reference to FIG. 30 of the drawings, the elongate recess 375 within the block 372 accommodates a generally rectilinear bearing 380, which is shown in detail in FIGS. 31 and 32. The bearing 380 is bonded in the elongate recess 375 of the block 372 and has a lower surface 381 that is configured to engage with an upper surface of the lower wall 374 of the block 372 and an upper surface 382 which may be provided with a low friction finish. The lower surface 381 is recessed as shown in FIG. 32 to accommodate a group of front permanent magnets 365, 366 to form a bearing assembly. In the fitted position, the front magnets 365, 366 are received in the recesses formed in the bearing 380 and corresponding recesses 383 formed in the upper surface of the lower wall 374 of the block 372 as shown in FIG. 29, with one of the front magnets 265 being positioned at the temple end of the recess 375 and the other front magnet being positioned at the nasal end of the recess 375. It will be noted that the present embodiment has only two front magnets 365, 366 in each bearing assembly, but in variants of the invention, three front magnets may be used as per Example 3 above or more than three front magnets to define more discrete positions for the rear lens element 341. The front magnets 365, 366 are oriented vertically in alignment with ay-axis that is substantially orthogonal to the x- and z-axes as shown in FIG. 26.

In this respect, the present embodiment differs from the arrangement of Example 3 above, in which the magnets 265, 266, 267, 268 are generally aligned with the z-axis. This arrangement allows the present embodiment to be thinner when viewed from the front and lighter, while retaining good guiding and retention of the rear lens element 341 along a defined transverse path, as described below.

The upper surface 382 of the bearing 380 is spaced below an lower surface of the upper wall 373 of the block to define an elongate slot which serves a similar function to the slots 51, 52 and 151, 152 and the recesses 251, 252 of the first, second and third embodiments described above in Examples 1, 2 and 3 respectively; namely to provide a guide for movement of the rear lens element 341 relative to the front lens element 331. As shown in FIG. 31, the bearing 380 further comprises an upstanding retaining protrusion 384 in a substantially central position which serves a similar function to the retaining nibs 292, 293 of Example 3 above.

Figure 27:
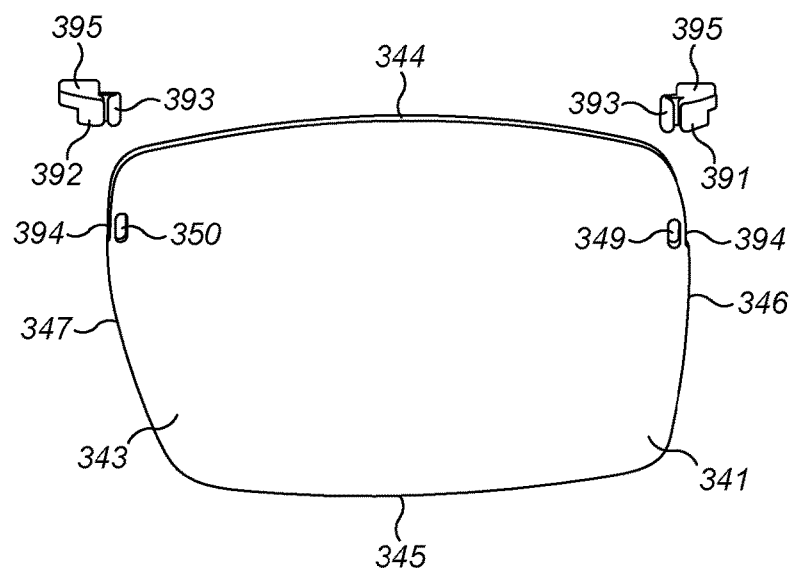
FIG. 27 is a rear elevation of the right-hand rear lens element of the rimless glasses of FIGS. 25 and 26, with left and right mounts for the rear lens element shown separately for clarity.

With reference to FIG. 27, the rear lens element 341 is formed with two apertures 349, 350 juxtaposed its temple and nasal side edges 346, 347 respectively and generally towards the top edge 344. The apertures extend fully through the rear lens element 341 and are configured to fasten temple and nasal rear mounts 391, 392 respectively. Each of the temple and nasal rear mounts 391, 392 comprises an integral rearwardly protruding lug 393 which is configured to form a tight push fit in the corresponding aperture 349, 350 for fastening the rear mount 391, 392 to the rear lens element 341 in a manner similar to the attachment of the elbow and nasal assemblies 371, 381 to the front lens element 331. Thus, in a similar way, the side edges 346, 347 of the rear lens element 341 are formed with a slot 394 that is configured to locate the rear mount 391, 392 against the adjacent side edge 346, 347. The depths of the slots 394 can be adjusted during edging of the rear lens element 341 to ensure a tight fit between rear temple and nasal mounts 391, 392 to the rear lens element 341.

Each of the temple and nasal rear mounts 391, 392 comprises a generally rectilinear body portion 395 that protrudes forwardly of the front surface 342 of the rear lens element 341 and is shaped and sized to form a close fit in the elongate slot in the corresponding elbow or nose-bridge assembly 371, 381 intermediate the upper surface 382 of the bearing 380, thereby permitting the body portion 395 to slide back and forth along the elongate slot between the upper wall 373 of the block 372 and the upper surface 382 of the insert whilst substantially prevent unwanted movement of the rear lens element 341, such was wobbling, twisting and the like relative to the front lens element 331. Suitably, the body portion 395 has flat top and bottom surfaces to engage with the interior surfaces of the corresponding elongate slot. The body portion 395 accommodates a rear permanent magnet 396 (see FIG. 28) which is received in a recess formed in the bottom surface of the body portion 395 such that the rear magnet 396 is oriented generally vertically on the y-axis for cooperation with the group of front magnets 365, 366 in the corresponding bearing assembly, which are similarly oriented.

As with the preceding embodiments, the front and rear magnets 365, 366; 396 attract one another to hold the front and rear lens elements 331, 341 together releasably in a plurality of discrete locations. In the present embodiment, the magnets 365, 366; 396 serve to locate the rear lens element 341 in a temple position in which it is slid all the way towards the temple arm 315, 316 or a nasal position in which it is slid all the way towards the nose bridge 314. Intermediate these positions, the magnets serve to hold the front and rear lens elements 331, 341 together but less strongly, so that the rear lens element 341 tends to want to move into one of the discrete locations. The strength of the magnets is such that a user is able to feel this through his or her fingers when manipulating the rear lens element 341 to shift it laterally between positions such that the arrangement defines a detent at each discrete location. In the present embodiment, the rear mounts 391, 392 are prevented from being accidentally removed from the front elbow and nose-bridge assemblies 371, 381 by the upstanding retaining protrusion 384 on the bearing 380 in the central position in the elongate slot. The rear lens element 341 can be selectively detached from the front lens element 331 when it is in one of the end positions.

As in the preceding embodiments, the front and rear lens elements 331, 341 are suitably configured such that the optical power of the lens 321, 322 increases as the rear lens element is slid laterally inwards towards the nose bridge 314 relative to the front lens element 331. The lenses 321, 322 thus have a distance mode when the rear lens element 341 is in the temple position and a reading mode when the rear lens element 341 is in the nasal position. Reducing the number of modes from three to two as compared with the third embodiment described above may allow the thickness of the lenses 321, 322 to be reduced. This in turn may removes weight from the product. As a result, the glasses 311 of the present embodiment may be made thinner and less bulky than the glasses 211 of Example 3. Making the product as similar in weight to that of a traditional set of eyeglasses is important to ensure comfort, familiarity and so on.

The arrangement of the present embodiment also aims to thin the material across the nose and at the elbows such that it provides some additional give/spring, thus taking load away from glazing joints by allowing the front lens element 331 assembly to flex. Further, in the present embodiment, the rear mounts 391, 392 assemble from the front surface 342 of the rear lens element 341. This can provide benefits if it is desired to add a user's prescription to the lens 321, 322 as described above in Example 1, which would affect the rear surface 343 of the rear lens element 341. This surface is thus unconstrained by the rest of the design of the present embodiment.

Example 5

Figure 33:
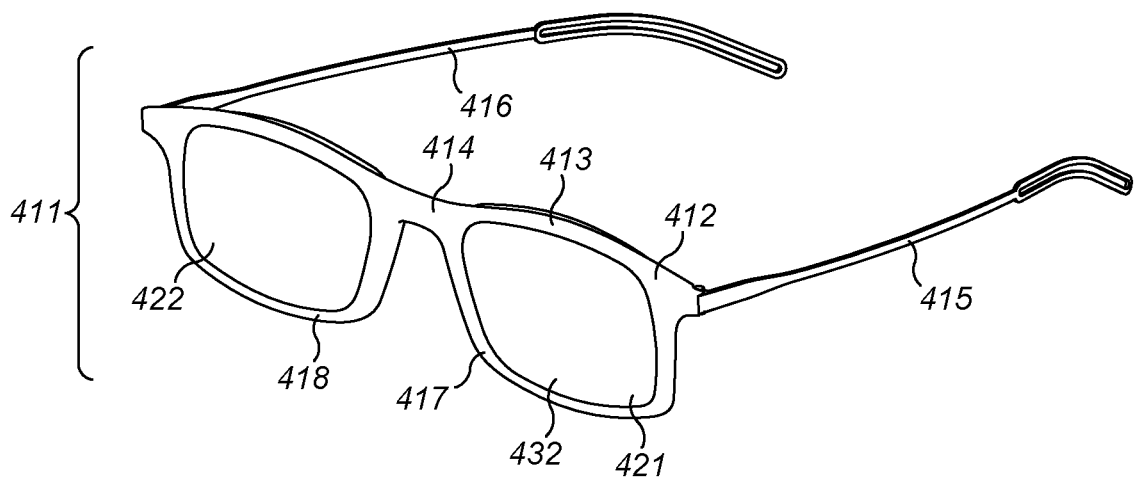
FIG. 33 is a perspective view from above and to the left hand side of a framed pair of glasses in accordance with a fifth embodiment of the invention which comprises a frame and two variable focal length lenses of the kind comprising front and rear lens elements that are arranged for lateral movement relative to one another for adjusting the optical power of the lens.
Figure 34:
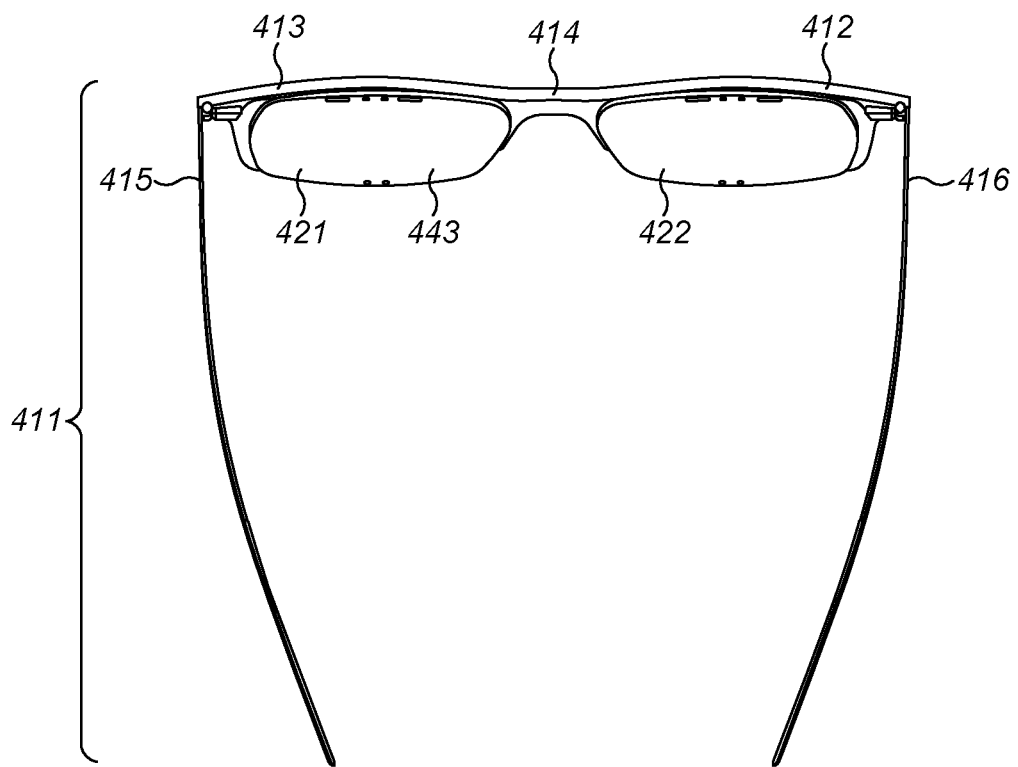
FIG. 34 is a perspective view from behind of the top of the framed glasses of FIG. 33.
Figure 35:
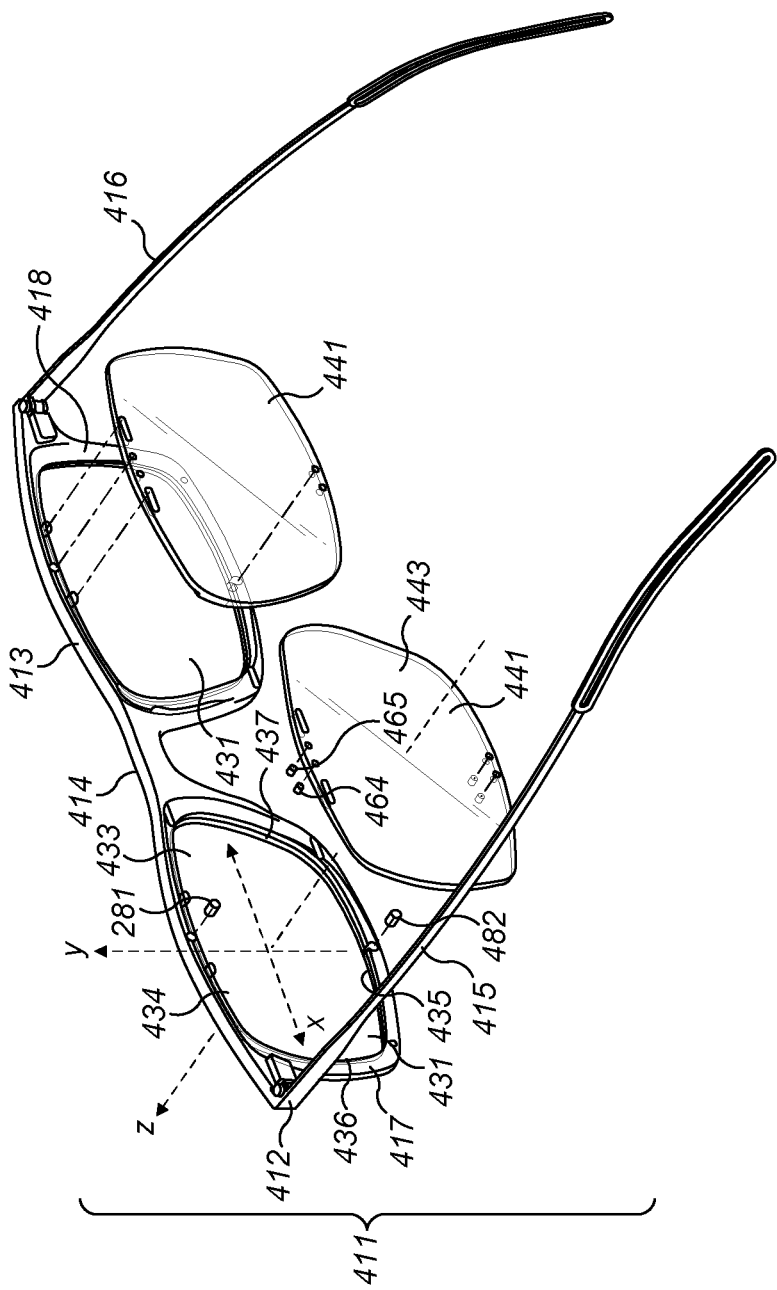
FIG. 35 is an exploded perspective view from above and to the left-hand side of the rear of the framed glasses of FIGS. 33 and 34 in which permanent magnets forming magnet couplings between front and rear lens elements are shown in the left-hand lens but omitted from the right-hand lens for clarity.

While Examples 1, 3 and 4 above are all rimless glasses, the present invention is equally well suited for use in framed eyeglasses. FIGS. 33-35 thus illustrate a frame pair of glasses 411 in accordance with a fifth embodiment of the invention. The glasses 411 comprises two variable focal length lenses 421, 422 which are mounted in a frame 412. The frame comprises a frame front portion 413, which incorporates two left and right shaped rim portions 417, 418 and an integral nose-bridge portion 414, and left and right hand side temple arms 415, 416, each of which is hinged to a respective one of the rim portions 417, 418 in a conventional manner.

Each of the variable focal length lenses 421, 422 comprises two superposed lens elements 431, 441 of the kind that are arranged to slide relative to one another in a direction transverse the direction of viewing for adjusting the focal power of the lens 421, 422. Lenses of this kind include Alvarez-type lenses which are described in detail in Example 1 above. The description of such lenses in Example 1 applies equally to the lenses 421, 422 of the present embodiment and need not be repeated here. The lenses 421, 422 thus comprise front and rear lens element 431, 441 respectively as shown clearly in FIG. 35. The front lens elements 431 are fixedly secured in the respective rim portions 417, 418, while the rear lens elements 441 are slidable relative to the front lens elements 431 in a direction indicated by axis x in FIG. 35, which extends transversely across the direction of viewing, which is indicated generally by axis z. In some embodiments, the frame 412 and front lens elements 431 of the lenses 421, 422 may be moulded as a single part or as three parts (frame, left front lens element, right front lens element) and assembled in the traditional manner (for example with a traditional bevel fit). In the first to fourth embodiments described above, the corresponding front and rear lens elements are formed with a base curve in a manner well known in the art, so in practice the transverse path followed by the rear lens element is arcuate in the x,z-plane instead of a straight line, as described. However, in the present embodiment, the transverse path is indeed a straight line.

The structure and operation of the left and right hand lenses 421, 422 is substantially the same, except that one is the mirror image of the other in a medial y,z-plane (not shown) that bisects the nose bridge 414 of the frame 412. In the following therefore only the left-hand lens 421 is described in detail, but the description applies equally to the right-hand lens 422.

Figure 36:
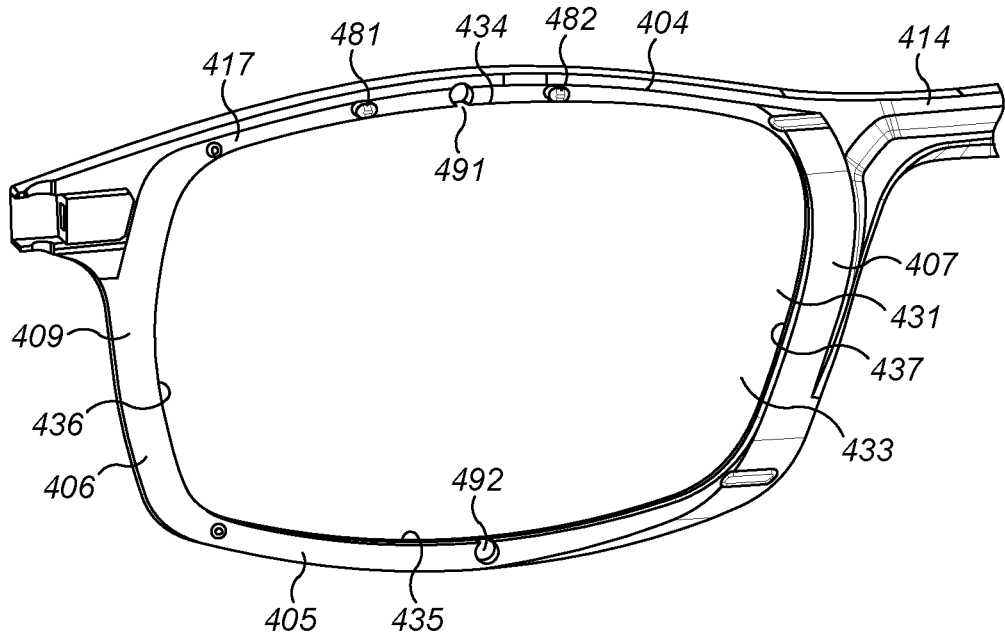
FIG. 36 is a rear elevation of a left-hand portion of a front part of the frame of the glasses of FIG. 35, which shows rearwardly projecting temple and nasal pins that form guiding elements for engaging with the rear lens element.

The front lens element 431 has a front surface 432 and a rear surface 433. The front lens element 431 is generally rectangular, albeit with arcuate sides and corners, and has a top edge 434, a bottom edge 435, a temple side edge 436 and a nasal side edge 437 (see FIG. 35). As best seen in FIG. 36, the top edge 434 of the front lens element 431 is mounted in the rim portion 417 contiguous an upper portion 404 of the rim portion 417, while the bottom edge 435 of the front lens element 431 is mounted in the rim portion 417 contiguous a lower portion 405 of the rim portion 417. The temple and nasal side edges 436, 437 of the front lens element 431 are mounted in the rim portion 417 contiguous corresponding temple and nasal portions 406, 407 of the rim portion 417 respectively. The upper, lower and side portions 404-407 of the frame 412 define a substantially planar rear surface 409. The width of the side portions 406, 407 is described in more detail below.

Figure 37:
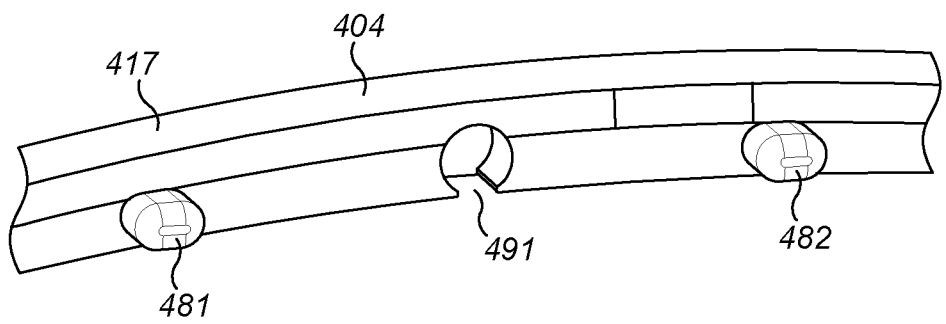
FIG. 37 is an enlarged view of part of FIG. 36 showing the temple and nasal pins and an intermediate socket for holding a permanent magnet.

The upper portion 404 of the rim portion 417 is formed with two guide pins 481, 482 that are spaced apart in the x-direction as shown in FIGS. 36 and 37. The guide pins 481, 482 protrude rearwardly of the rear surface 409 of the rim portion 417. Intermediate the two guide pins 481, 482 the rear surface of the upper portion 404 is formed with an upper recess 491 that accommodates a front upper permanent magnet 481 that is oriented along the z-axis. The magnet 481 is positioned flush with the rear surface 409. The lower portion 405 of the rim 417 is formed with a similar lower recess 492 in a generally central position that similarly accommodates a front lower permanent magnet 482 as shown in FIG. 35.

Figure 38:
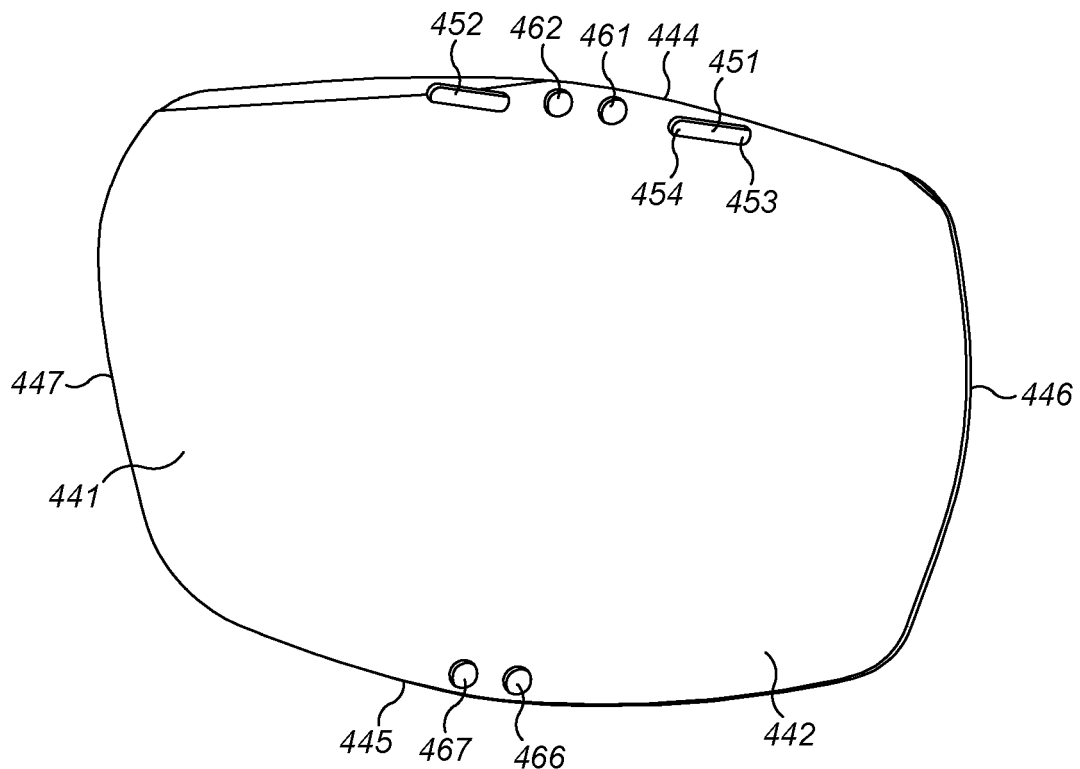
FIG. 38 is a front elevation of the rear lens element of the left-hand variable focal length lens of the glasses of FIG. 33-35, showing slots arranged to receive the temple and nasal pins and recesses adjacent top and bottom edges of the rear lens element to receive permanent magnets.
Figure 39:
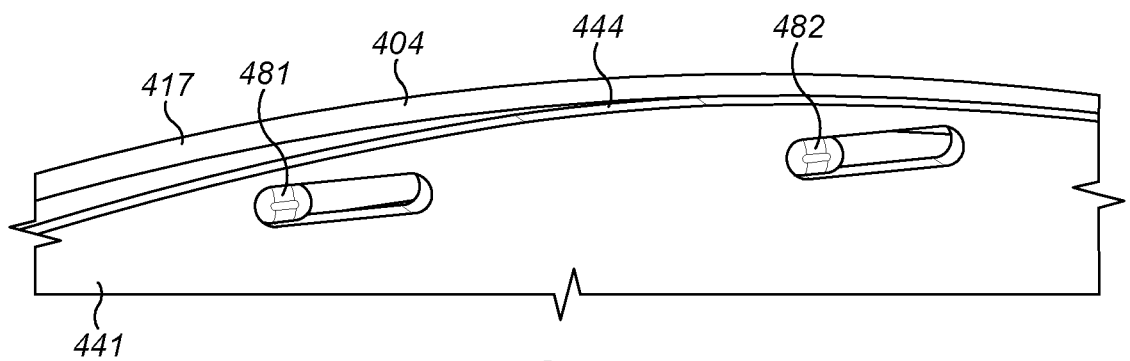
FIG. 39 is an enlarged view of part of the left-hand lens of the glasses of FIGS. 33-35 showing the assembly of the front and rear lens elements with the temple and nasal pins on the front lens element extending in the slots in the rear lens element.

With reference to FIG. 38, the rear lens element 441 has front and rear surfaces 442, 443 and a shape and size that matches the front lens element 431. The rear lens element 441 has a top edge 444, a bottom edge 445 and temple and nasal side edges 446, 447. Unlike the first to fourth embodiments described above, the width of the rear lens element 441 between the temple and nasal side edges 446, 447 is greater than the corresponding width of the front lens element 431 as described in more detail below. The rear lens element 441 is formed with two elongate slots 451, 452 adjacent the top edge 444 that extend completely through the rear lens element 441 and are oriented along the x-axis. Each slot 451, 452 has a temple end 453 and a nasal end 454 and is arranged to receive slidingly a respective one of the guide pins 481, 482 on the front lens element 431, as shown in FIG. 39. It will be appreciated that in a variant, the guide pins can be formed instead on the rear lens element 441, protruding forwards and received in corresponding slots in the front lens element 431.

Between the two slots 451, 452, the front surface of the rear lens element 441 is formed with two spaced upper recesses 461, 462, each of which accommodates a rear upper permanent magnet 464, 465 respectively. The rear upper permanent magnets 464, 465 are oriented along the z-axis for coupling with the front upper magnet 481 in the front lens element 431, flush with the front surface 442 of the rear lens element 441. Aligned with the upper recesses 461, 462, the front surface 442 of the rear lens element 441 is formed with two further lower recesses 466, 467 juxtaposed the bottom edge 445. Each of the lower recesses 466, 467 accommodates a rear lower permanent magnet (not shown) that is oriented along the z-axis for coupling with the front lower magnet 482, flush with the front surface 442 of the rear lens element 441.

By separating the permanent magnets 464, 465, 466, 467, 481, 482 from the guiding elements constituted by the slots 451, 452 and guide pins 481, 482, the present embodiment allows permanent magnets to be used of a size that is not constrained by the size of the slots 451, 452.

The guide pins 481, 482 form a close fit in the slots 451, 452 for allowing the rear lens element 441 to slide back and forth relative to the front lens element 431 for changing the focal length of the lens 421, while preventing unwanted twisting of the front and rear lens elements 431, 441 relative to one another. The side portions 406, 407 of the rim portion 417 are dimensioned such that in each position of the rear lens element 441, the temple and nasal edges 446, 447 of the rear lens element 441 are masked by the frame 412 and thus "invisible" from an onlooker's perspective, although the outer edges of the rear lens element remain visible from the side.

As in the previous embodiments, the slots 451, 452 and guide pins 481, 482 form guide elements for guiding movement of the rear lens element 441 relative to the front lens element 431 along the transverse path for varying the focal length of the lens 421. The front and rear upper and lower permanent magnets 464, 465, 466, 467, 481, 482 couple the front and rear lens elements 431, 441 together magnetically with sufficient retention force to fold the lens elements 431, 441 together. The front and rear lens elements 431, 441 are held together more strongly when the front upper and lower magnets 481, 482 are aligned respectively with the upper and lower temple rear magnets 464, 466 or the upper and lower nasal rear magnets 465, 467, which thus serve to define two discrete positions for the rear lens element 441 relative to the front lens element 431. Suitably the front and rear lens elements 431, 441 have a greater optical power when the rear lens element 441 is in a nasal position with the front and rear lens elements 431, 441 aligned with the upper and lower nasal rear magnets 465, 467 than when the rear lens element 441 is in a temple position with the front and rear lens elements 431, 441 aligned with the upper and lower temple rear magnets 464, 466. It will be appreciated that in variants of the present embodiment, the upper and lower groups of magnets on the front surface 442 of the rear lens element 441 may comprise more than two magnets, e.g. three or more magnets to define a greater number of discrete positions.

In a variant of Example 5, the guide pins 481, 482 may comprises a cut-out portion (not shown) which defines an end portion. The guide pins 481, 482 may thus be retained within the slots 51, 52 during activation of the lens 421 between the discrete detent positions defined by the magnets 464, 465, 466, 467, 481, 482 in a manner similar to that described above in relation to the first embodiment, by inter-engagement of the end portion of each guide pin 481, 482 and a retaining rib (not shown) formed within each slot 51, 52.

The invention claimed is:

1. Adjustable focal length eyewear comprising two lenses that are mounted to a frame for supporting the lenses in front of a user's eyes, thereby defining a viewing direction through each lens; at least one of the lenses being a variable focal length lens of the kind comprising two superposed lens elements having cooperating optical surfaces that are shaped such that the focal length of the variable focal length lens is variable according to the relative lateral disposition of the lens elements; wherein one of the lens elements is fixedly mounted to the frame and the other lens element is movable manually relative to the fixed lens element for varying the focal length of the variable focal length lens; wherein guiding parts are provided on the movable lens element which cooperate with corresponding guiding parts on the fixed lens element or the frame to define and constrain movement of the movable lens element relative to the fixed lens element to a transverse path that extends across the viewing direction; and wherein one or more releasable fasteners are provided for releasably fastening the movable lens element to the fixed lens element or frame whilst permitting movement of the movable lens element relative to the fixed lens element along the transverse path, the one or more releasable fasteners comprising mutually cooperating parts on the movable lens element and the fixed lens element or the frame.

2. The adjustable focal length eyewear as claimed in claim 1, which comprises at least two releasable fasteners that are spaced apart on the lens in a direction transverse the direction of viewing.

3. The adjustable focal length eyewear as claimed in claim 1, wherein the one or more releasable fasteners include one or more separable mechanical fasteners which comprise resilient interengaging formations on the fixed and movable lens elements which, upon application of progressively increasing separating forces that urge the lens elements apart in the direction of viewing, initially resist separation of the lens elements whilst permitting movement of the movable lens element along the transverse path and eventually deform to allow the resilient interengaging formations to disengage from one another, thereby allowing the movable lens element to be detached from the fixed lens element.

4. The adjustable focal length eyewear as claimed in claim 1, wherein the one or more releasable fasteners define one or more discrete detent positions in the transverse path where the lens elements are held together releasably in the direction of the transverse path, so that additional force is needed to release the lens elements from the detent position for sliding along the transverse path.

5. The adjustable focal length eyewear as claimed in claim 1, wherein the one or more releasable fasteners include one or more separable magnetic fasteners that comprise mutually cooperating discrete magnetic parts on the movable lens element and the fixed lens element or the frame.

6. The adjustable focal length eyewear as claimed in claim 5, wherein the mutually cooperating discrete magnetic parts on the movable lens element and the fixed lens element or the frame define at least two selectable discrete detent positions of the movable lens element relative to the fixed lens element.

7. The adjustable focal length eyewear as claimed in claim 5, which comprises two or more magnetic fasteners between the movable lens element and the fixed lens element or frame; wherein the two or more magnetic fasteners define at least two selectable discrete detent positions of the movable lens element along the transverse path relative to the fixed lens element.

8. The adjustable focal length eyewear as claimed in claim 5, wherein the or each magnetic fastener comprises a group of discrete magnetic parts on one of the movable lens element or the fixed lens element or frame and at least one cooperating magnetic part on the other of the fixed lens element or frame or the movable lens element; wherein the magnetic parts on the movable lens element and the fixed lens element or frame attract one another to attach the movable lens element to the fixed lens element or frame whilst permitting manual movement of the movable lens element relative to the fixed lens element along the transverse path and manual detachment of the movable lens element from the fixed lens element or frame when desired.

9. The adjustable focal length eyewear as claimed in claim 8, wherein the magnetic parts of the group are spaced apart along the transverse path.

10. The adjustable focal length eyewear as claimed in claim 1, wherein the guiding parts on the movable lens element and the cooperating guiding parts on the fixed lens element or the frame form at least two linear or curvilinear guides that define that transverse path and wherein the guides are spaced apart on the lens in the direction of the transverse path.

11. The adjustable focal length eyewear as claimed in claim 10, wherein each guide comprises a dowel on one of the lens elements and a slot in the other lens element, wherein the dowel engages with edges of the other lens element around the slot for constraining relative movement of the two lens elements to the transverse path.

12. The adjustable focal length eyewear as claimed in claim 10, wherein each guide comprises a bearing fastened to or formed integrally with the frame and a mount fastened to the moveable lens element; wherein the bearing is disposed adjacent a slot and the mount is shaped to engage with the bearing in the slot for constraining relative movement of the two lens elements to the transverse path.

13. The adjustable focal length eyewear as claimed in claim 10, wherein the frame includes a rim portion that extends at least partially around the variable focal length lens, and each guide comprises a guide pin that protrudes from the rim portion or from the movable lens element and a slot formed in the movable lens element or in the rim portion respectively, wherein the guide pin engages with edges of the movable lens element or rim portion around the slot for constraining relative movement of the two lens elements to the transverse path.

14. The adjustable focal length eyewear as claimed in claim 13, wherein a group of two or more magnetic parts are attached to the rim portion or to the movable lens element at two or more discrete locations and a cooperating magnetic part is attached to the movable lens element or to the rim portion respectively to attach the movable lens element to the frame and to define the selectable discrete detent positions.

15. The adjustable focal length eyewear as claimed in claim 1, wherein at least part of a top or bottom edge of the movable lens element protrudes respectively above or below a corresponding part of a top or bottom edge of the fixed lens element to facilitate manual movement of the movable lens element by a user.

16. The adjustable focal length eyewear as claimed in claim 1, wherein the guiding parts are configured to permit the movable lens element to be detached from the fixed lens element or the frame.

17. The adjustable focal length eyewear as claimed in claim 1, wherein the cooperating parts of the fasteners are separable from one another and, at least in one position of the movable lens element, upon application of force urging the fixed and movable lens elements apart along the viewing direction, the movable lens element detaches from the fixed lens element or the frame.

18. A variable focal length lens of the kind comprising two lens elements that are mutually superposed in a direction of viewing through the lens and have cooperating optical surfaces that are shaped such that the focal length of the variable focal length lens is variable according to the relative lateral disposition of the lens elements in a direction transverse the direction of viewing; wherein mutually cooperating guiding parts are provided on the lens elements which define and constrain relative movement of the lens elements to a transverse path that extends in the transverse direction; and wherein one or more releasable fasteners are provided for releasably fastening the two lens elements together whilst permitting relative movement of the lens elements along the transverse path.

19. The variable focal length lens as claimed in claim 18, wherein the guiding parts allow the lens elements to be separated from one another.

20. A variable focal length lens of the kind comprising two lens elements that are mutually superposed in a direction of viewing through the lens and have cooperating optical surfaces that are shaped such that the focal length of the variable focal length lens is variable according to the relative lateral disposition of the lens elements in a direction transverse the direction of viewing; wherein mutually cooperating guiding parts are provided on the lens elements which define and constrain relative movement of the lens elements to a transverse path that extends in the transverse direction; wherein one or more magnetic fasteners are provided for releasably fastening the two lens elements together whilst permitting relative movement of the lens elements along the transverse path; wherein the magnetic fasteners are spaced apart on the lens in a direction transverse the direction of viewing and comprise mutually cooperating discrete magnetic parts on the lens elements that define at least two selectable discrete detent positions of the lens elements relative to one another; and wherein the guiding parts allow the lens elements to be separated from one another.

* * * * *